(12) United States Patent
Plastina et al.

(10) Patent No.: US 7,756,388 B2
(45) Date of Patent: Jul. 13, 2010

(54) MEDIA ITEM SUBGROUP GENERATION FROM A LIBRARY

(75) Inventors: Daniel Plastina, Sammamish, WA (US); Jonathan M. Cain, Seattle, WA (US); Michael J. Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 11/085,489

(22) Filed: Mar. 21, 2005

(65) Prior Publication Data

US 2006/0212478 A1 Sep. 21, 2006

(51) Int. Cl.
*H04N 5/91* (2006.01)
*H04N 7/26* (2006.01)

(52) U.S. Cl. .................................. 386/46; 386/124
(58) Field of Classification Search ................. 386/46
See application file for complete search history.

(56) References Cited

U.S. PATENT DOCUMENTS

| | | | |
|---|---|---|---|
| 5,616,876 | A | 4/1997 | Cluts |
| 5,749,081 | A | 5/1998 | Whiteis |
| 6,041,311 | A | 3/2000 | Chislenko et al. |
| 6,118,450 | A | 9/2000 | Proehl et al. |
| 6,243,725 | B1 | 6/2001 | Hempleman et al. |
| 6,311,194 | B1 | 10/2001 | Sheth et al. |
| 6,356,971 | B1 | 3/2002 | Katz et al. |
| 6,438,579 | B1 | 8/2002 | Hosken |
| 6,452,609 | B1 | 9/2002 | Katinsky et al. |
| 6,453,336 | B1 | 9/2002 | Beyda et al. |
| 6,453,339 | B1 | 9/2002 | Schultz et al. |
| 6,526,411 | B1 | 2/2003 | Ward |
| 6,539,395 | B1 | 3/2003 | Gjerdingen et al. |

(Continued)

FOREIGN PATENT DOCUMENTS

EP 1189437 A1 3/2002

(Continued)

OTHER PUBLICATIONS

Edward Swierk, et al., The Roma Personal Metadata Service, Mobile Networks and Applications vol. 7, pp. 407-418, 2002.

(Continued)

*Primary Examiner*—Marsha D Banks Harold
*Assistant Examiner*—Oluwaseun A Adegeye
(74) *Attorney, Agent, or Firm*—Senniger Powers LLP

(57) ABSTRACT

A method for generating a subgroup of one or more media items from a library of media items. The method monitors user playback control actions during a playback experience with the library on a media player. The method chooses a selecting filter based upon the monitored user playback control action and generates a subgroup of media items selected from the library of media items by applying the selecting filter to the library of media items. The method may further order the subgroup of media items. A system also generates a subgroup of one or more media items from a library of media items. The system comprises a processor for monitoring a user playback control action during a playback experience with the library, a selecting filter adapted to generate a subgroup of media items from the library of media items, and a user interface adapted for presenting the user with the subgroup of media items for playing on a media player.

15 Claims, 19 Drawing Sheets

U.S. PATENT DOCUMENTS

| | | |
|---|---|---|
| 6,545,209 B1 | 4/2003 | Flannery et al. |
| 6,605,770 B2 | 8/2003 | Yamane et al. |
| 6,657,117 B2 | 12/2003 | Weare et al. |
| 6,721,741 B1 | 4/2004 | Eyal et al. |
| 6,748,395 B1 | 6/2004 | Picker et al. |
| 6,760,721 B1 | 7/2004 | Chasen et al. |
| 6,771,568 B2 | 8/2004 | Hochendoner |
| 6,772,408 B1 | 8/2004 | Velonis et al. |
| 6,832,293 B1 | 12/2004 | Tagawa et al. |
| 6,941,324 B2 | 9/2005 | Plastina et al. |
| 6,947,922 B1 | 9/2005 | Glance |
| 6,973,451 B2 | 12/2005 | Laronne et al. |
| 6,996,390 B2 | 2/2006 | Herley et al. |
| 7,043,525 B2 | 5/2006 | Tuttle et al. |
| 7,227,073 B2 | 6/2007 | Kim |
| 2001/0031066 A1 | 10/2001 | Meyer et al. |
| 2002/0001395 A1 | 1/2002 | Davis et al. |
| 2002/0033844 A1 | 3/2002 | Levy et al. |
| 2002/0041692 A1 | 4/2002 | Seto et al. |
| 2002/0055951 A1 | 5/2002 | Shigetomi et al. |
| 2002/0059370 A1 | 5/2002 | Shuster |
| 2002/0059584 A1 | 5/2002 | Ferman et al. |
| 2002/0069218 A1 | 6/2002 | Sull et al. |
| 2002/0087565 A1 | 7/2002 | Hoekman et al. |
| 2002/0099694 A1 | 7/2002 | Diamond et al. |
| 2002/0099737 A1 | 7/2002 | Porter et al. |
| 2002/0103796 A1 | 8/2002 | Hartley |
| 2002/0103920 A1 | 8/2002 | Berkun et al. |
| 2002/0113824 A1 | 8/2002 | Myers |
| 2002/0120925 A1 | 8/2002 | Logan |
| 2002/0134220 A1 | 9/2002 | Yamane et al. |
| 2002/0138619 A1 | 9/2002 | Ramaley et al. |
| 2002/0143976 A1 | 10/2002 | Barker et al. |
| 2002/0146235 A1 | 10/2002 | Watanabe et al. |
| 2002/0147728 A1 | 10/2002 | Goodman et al. |
| 2002/0157095 A1 | 10/2002 | Masumitsu et al. |
| 2002/0196976 A1 | 12/2002 | Mihcak et al. |
| 2003/0033420 A1 | 2/2003 | Eyal et al. |
| 2003/0036948 A1 | 2/2003 | Woodward et al. |
| 2003/0045953 A1 | 3/2003 | Weare |
| 2003/0045954 A1 | 3/2003 | Weare et al. |
| 2003/0120928 A1 | 6/2003 | Cato et al. |
| 2003/0135513 A1* | 7/2003 | Quinn et al. ................ 707/102 |
| 2003/0182100 A1 | 9/2003 | Plastina et al. |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0221541 A1 | 12/2003 | Platt |
| 2003/0225777 A1 | 12/2003 | Marsh |
| 2003/0236582 A1 | 12/2003 | Zamir et al. |
| 2003/0236695 A1* | 12/2003 | Litwin, Jr. .................... 705/10 |
| 2004/0006575 A1 | 1/2004 | Visharam et al. |
| 2004/0017997 A1 | 1/2004 | Cowgill |
| 2004/0059795 A1 | 3/2004 | Ramey |
| 2004/0060426 A1 | 4/2004 | Weare et al. |
| 2004/0064476 A1 | 4/2004 | Rounds |
| 2004/0086268 A1 | 5/2004 | Radha et al. |
| 2004/0123725 A1 | 7/2004 | Kim |
| 2004/0128308 A1 | 7/2004 | Obrador |
| 2004/0172593 A1 | 9/2004 | Wong et al. |
| 2004/0186993 A1 | 9/2004 | Risan et al. |
| 2004/0210533 A1 | 10/2004 | Picker et al. |
| 2004/0254659 A1 | 12/2004 | Bolas et al. |
| 2004/0260786 A1 | 12/2004 | Barile |
| 2004/0267693 A1 | 12/2004 | Lowe et al. |
| 2005/0021500 A1 | 1/2005 | Plastina et al. |
| 2005/0098023 A1 | 5/2005 | Toivonen et al. |
| 2005/0229225 A1 | 10/2005 | Klausberger et al. |
| 2005/0234958 A1 | 10/2005 | Sipusic et al. |
| 2005/0240661 A1 | 10/2005 | Heller et al. |
| 2005/0249080 A1* | 11/2005 | Foote et al. ................ 369/59.1 |
| 2005/0278726 A1 | 12/2005 | Cano et al. |
| 2006/0032363 A1 | 2/2006 | Platt |
| 2006/0156236 A1 | 7/2006 | Heller et al. |
| 2006/0168340 A1 | 7/2006 | Heller et al. |
| 2006/0271989 A1 | 11/2006 | Glaser et al. |
| 2007/0025194 A1 | 2/2007 | Morse et al. |

FOREIGN PATENT DOCUMENTS

| | | |
|---|---|---|
| WO | 0128222 A2 | 4/2001 |
| WO | 03023781 A1 | 3/2003 |

OTHER PUBLICATIONS

MusicMatch, MusicMatch Jukebox User's Guide, Feb. 7, 2003, Chapters A1-A6 & 1-9.

* cited by examiner

FIG. 11
FIG. 12
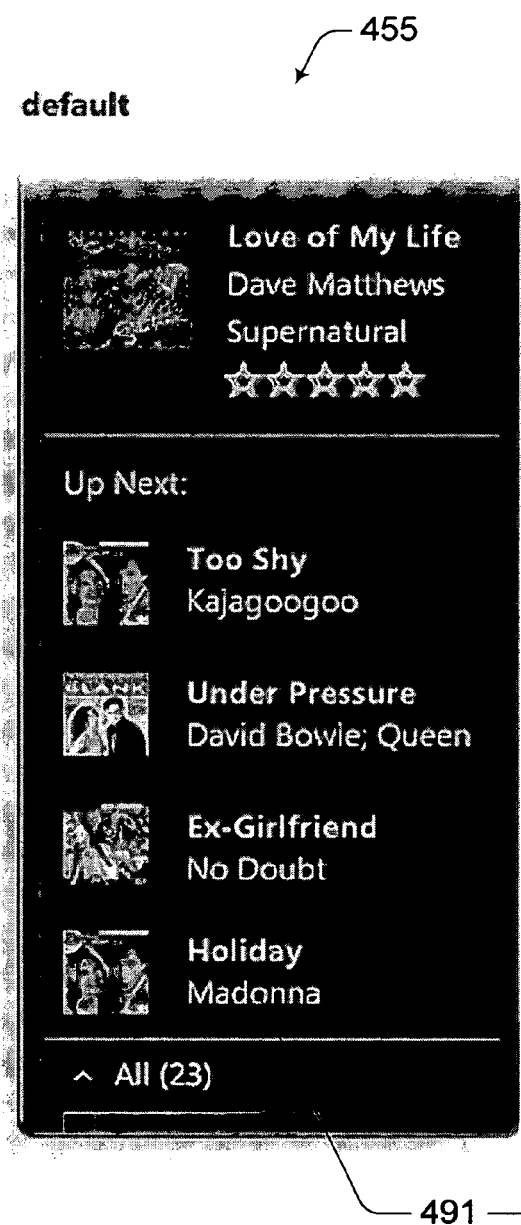
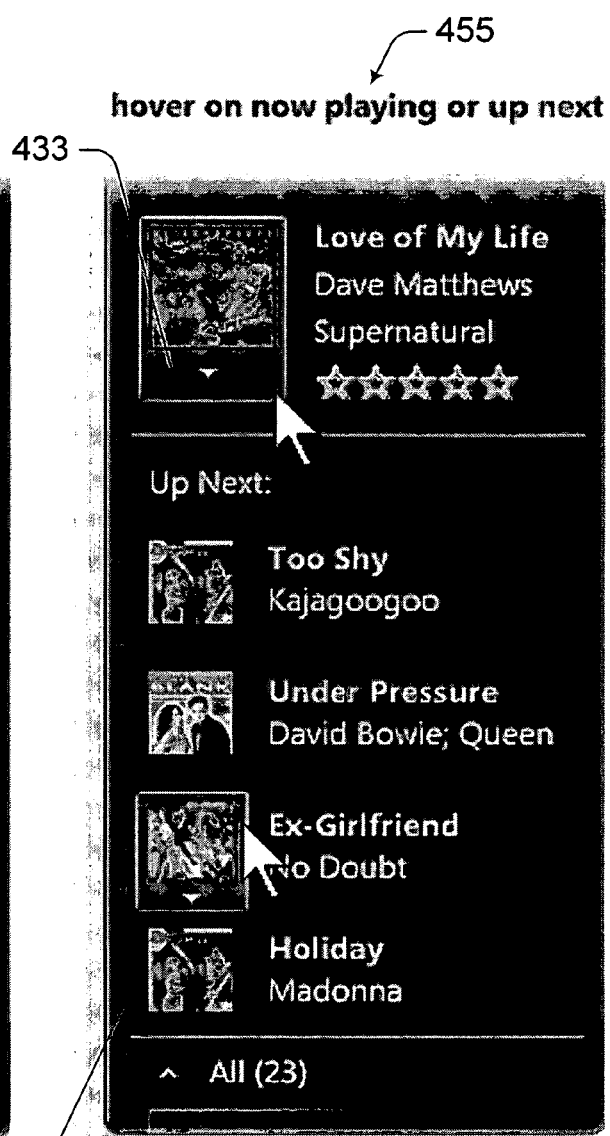

FIG. 19
FIG. 20
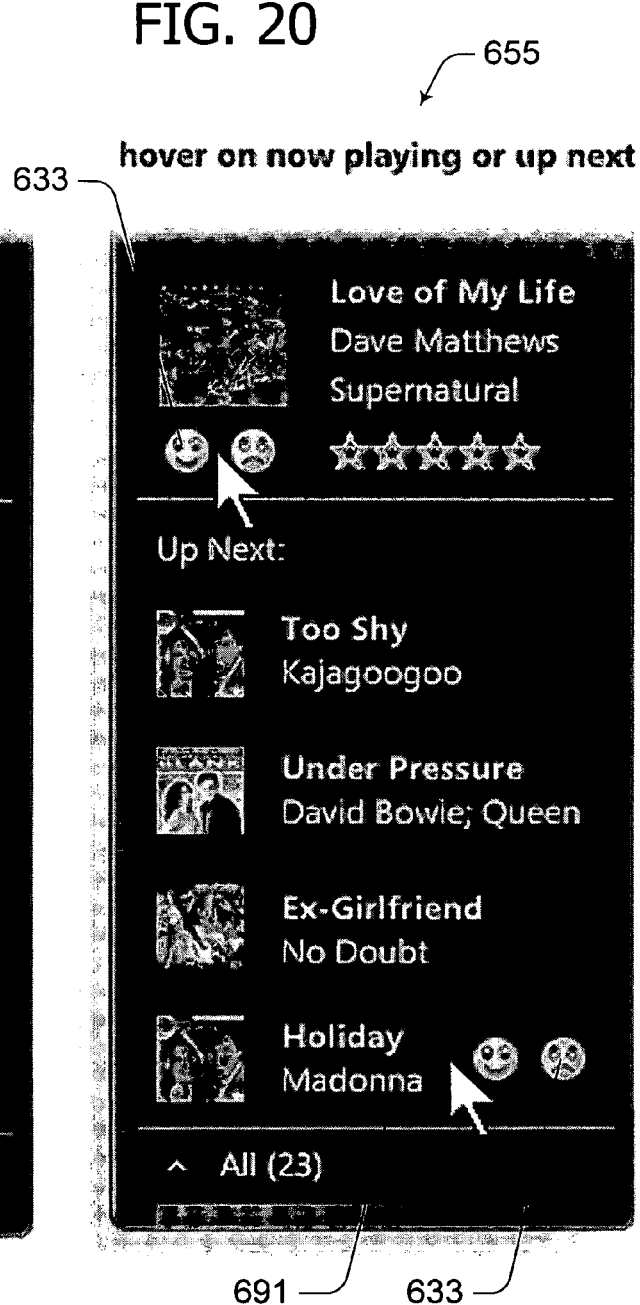

FIG. 22
FIG. 23
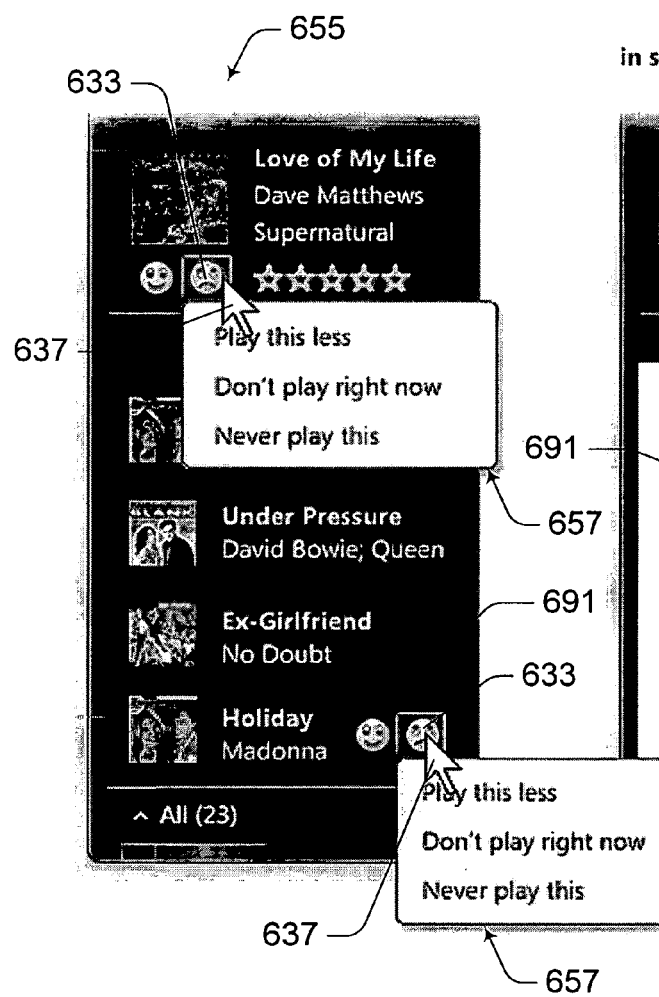
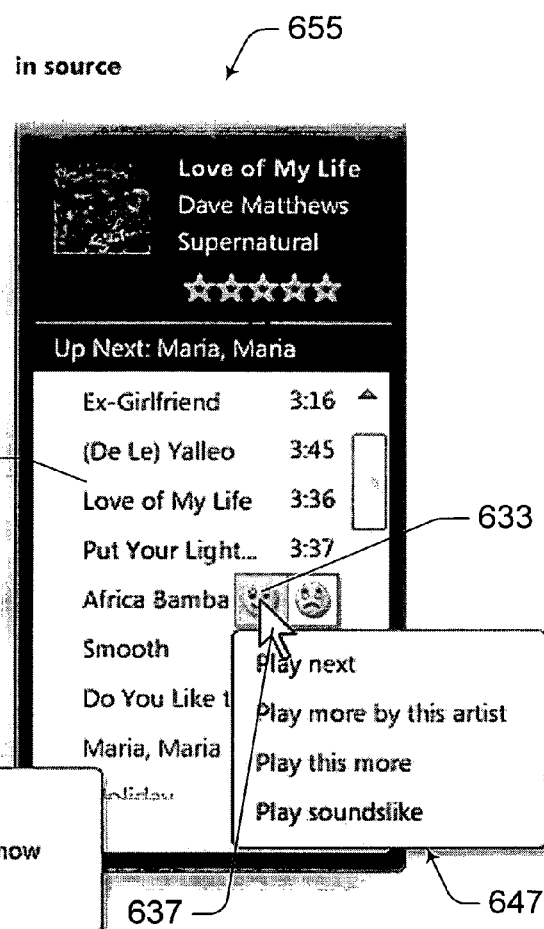

MEDIA ITEM SUBGROUP GENERATION FROM A LIBRARY

TECHNICAL FIELD

Embodiments of the present invention relate to the field of generating subgroups of media items from a collection or multiple collections (i.e., a library or libraries) of media items. In particular, embodiments of this invention relate to methods and systems capable of generating media item playlists based upon user behavior and/or user selection.

BACKGROUND OF THE INVENTION

Due to recent advances in technology, computer users are now able to enjoy many features that provide an improved user experience, such as playing various media and multimedia content on personal, laptop, or handheld computers, as well as cellular phones and other portable media devices. For example, most computers today are able to play compact discs (CDs) and have an internet connection capable of streaming and downloading audio and video so users can listen to their favorite media while working on their computers. Many computers are also equipped with digital versatile disc (DVD) drives enabling users to watch movies.

In some multimedia environments, a computer has access to a computer-readable medium storing media files such as Moving Picture Experts Group audio layer-3 (MP3) files and WINDOWS MEDIA technologies audio (WMA) and video files. The computer typically organizes the media files into playlists when the compressed media files are played on the computer.

Conventionally, users must expend considerable time and energy to build a playlist of media items (e.g., video files, music files, photos, etc.) of any complexity. Media items must be individually selected and added to each playlist. In addition to the effort required, users may also have difficulty constructing a playlist including each of the media items they desire. For example, remembering the name of each particular media item (or artist, genre, creator, creation date, style, etc.) to include in a playlist is difficult. This inability to recall each desirable media item can lead to user-created playlists that include only a few common media items familiar to the user. Such playlists can be mundane, repetitive, and generally not pleasing, even to the creator.

The issue of recalling media items of interest is exacerbated with the era of online media item libraries, such as for music and other audio, movies and other video, among others. For example, a single user can easily subscribe to a media service having over a million available media items. Such a subscription simply provides too many choices for a single user to review and consider for a playlist.

Beyond inadequate time and inability to recall particular media items, other issues may also discourage particular users from authoring their own playlists. For example, a user who is not particularly computer savvy may not realize such a subgroup of his particular collection or multiple collections (i.e., a library or libraries) may be created. Others may simply not have the knowledge about the media to make such a playlist. Such users still have preferences about media and display strong opinions when exposed to different media items, even though they have no idea who wrote or is performing such items. Broadcast radio caters to such listeners by programming the listening experience according to a particular listening experience, or genre, such as easy listening, jazz, rhythm and blues, country, rock and roll, etc.

Unfortunately, these issues are not addressed by any conventional system. Conventional techniques provide only limited amounts of assistance to the user in creating playlists, such as sorting by media type or artist. Such conventional techniques provide no automatic playlist formation based upon user behavior or simple user feedback. Conventional techniques also require disclosure of much personal information from the user to a server so that the server can build the playlist. Because such information is personal, it is more desirable to retain such user information at the client, rather than the server. There is a need, therefore, for a system or method capable of generating a playlist of media items tailored to a user's needs in a more automatic way on the user's device, while retaining the direct, or indirect, control of the user. In other words, the system or method assists the user in media item (e.g., music, video, etc.) selection. Accordingly, a solution that enables playlist creation based upon simple user actions occurring during the playback of media items to automatically update the user playlist is desired.

SUMMARY OF THE INVENTION

Accordingly, a method (or a system) for generating a subgroup of one or more media items from a library of media items is desired to address one or more of these and other disadvantages. The method comprises monitoring a user playback control action during a playback experience with the library, choosing a selecting filter based upon the monitored user playback control action, and generating a subgroup of media items selected from the library of media items by applying the selecting filter to the library of media items. For example, embodiments of the invention may be well-suited for providing assistance to users in creating ordered subgroups, or playlists, of appropriate media items with relatively little effort and direct input from the user. Advantageously, aspects of the present invention permit creating of playlists based upon user playback control actions monitored during a user's playback experience, rather than on direct solicitation of feedback from the user. Moreover, in at least one embodiment, the invention also provides for the creation of playlists by soliciting minimal feedback from the user with respect to media items currently playing or collected as part of a playlist.

In one aspect of the invention, a method for generating a subgroup of one or more media items from a library of media items comprises monitoring a user playback control action during a playback experience with the library. The method further comprises choosing a selecting filter based upon the monitored user playback control action and generating a subgroup of media items selected from the library of media items by applying the selecting filter to the library of media items.

In another aspect of the invention, a system for generating a subgroup of one or more media items from a library of media items comprises a processor for monitoring a user playback control action during a playback experience with the library. The system further comprises a selecting filter adapted to generate a subgroup of media items from the library of media items. The processor chooses the selecting filter based upon the monitored user playback control action. The system further comprises a user interface adapted for presenting the user with the subgroup of media items for playing on a media player.

In still another aspect of the invention, a method for ordering a subgroup of one or more media items from a library of media items is disclosed. The method comprises monitoring a user playback control action during a playback experience with the library and choosing an ordering filter based upon the monitored user playback control action. The method further comprises ordering the subgroup of media items from the library of media items by applying the ordering filter to the subgroup of media items.

Alternatively, the invention may comprise various other methods, systems, computer-readable media, and apparatuses.

Other features will be in part apparent and in part pointed out hereinafter.

BRIEF DESCRIPTION OF THE DRAWINGS

FIG. 11 is an exemplary screenshot of still another user interface for a playlist of musical media items;

FIG. 12 is an exemplary screenshot of the user interface of FIG. 11 with a selection element engaged;

FIG. 19 is an exemplary screenshot of yet another user interface for a playlist of musical media items;

FIG. 20 is an exemplary screenshot of the user interface of FIG. 19 with multiple selection elements engaged;

FIG. 22 is an exemplary screenshot of the user interface of FIG. 19 with additional selection elements engaged;

FIG. 23 is an exemplary screenshot of the user interface of FIG. 19 with an alternate playlist view and additional selection elements engaged.

Corresponding reference characters indicate corresponding parts throughout the drawings.

DETAILED DESCRIPTION OF THE INVENTION

System for Generating a Subgroup of Media Items

Figure 1:
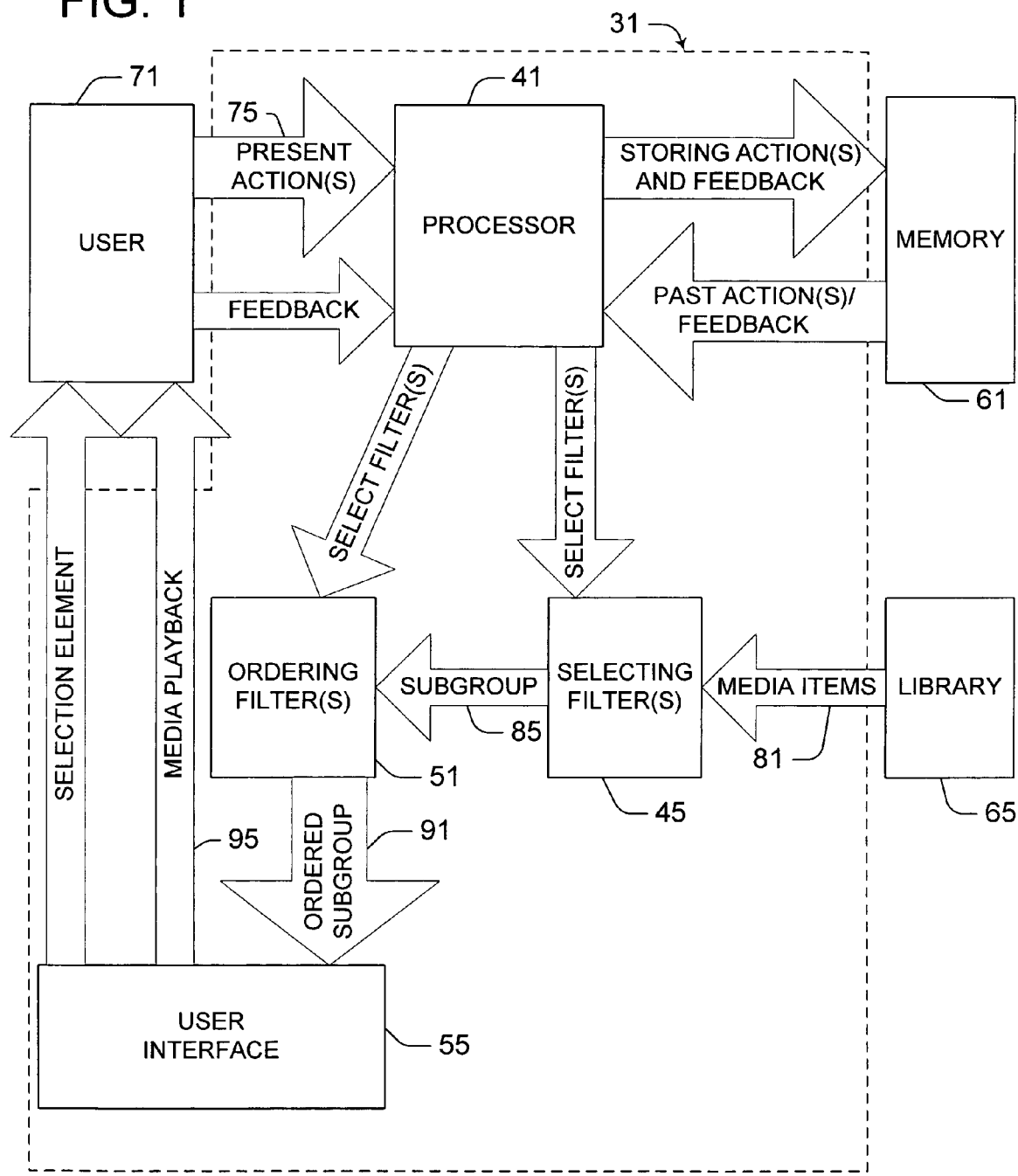
FIG. 1 is a system of the present invention for generating a subgroup of one or more media items from a library of media items.

Referring now to FIG. 1, a system, generally indicated at 31, for generating a subgroup of one or more media items from a collection or multiple collections (i.e., a library or libraries) of media items is depicted. The system 31 comprises several components, including a processor 41, a selecting filter 45, an ordering filter 51, and a user interface 55. A memory 61 storing user preferences and a library 65 storing media items accessible by a user 71 via the system 31 are also depicted in FIG. 1. The memory 61 and library 65 may be separate from the system 31, as shown in FIG. 1, or may alternately be contained within the system, without departing from the scope of the claimed invention. In particular, the library 65 may comprise a single collection of media items or multiple collections of media items that may be local to the system 31, or spread across a network or the internet.

The processor 41 monitors user playback control actions 75 during a user's playback experience with the library 65. In one example, the user 71 may utilize a media player program on a computer 130 (see FIG. 24) to access the library 65 of media items. In utilizing the media player to access media items 81 from the library 65, the user 71 will inevitably take some actions that will provide some useful information regarding his media (e.g., musical) preferences. From skipping a media item that is less desirable to increasing the media player volume to better hear a favorite media item, a user 71 interacting with the media player can provide valuable data regarding appropriate and inappropriate media item choices. The details of these user playback control actions will be discussed in greater detail below. As used herein, media items 81 may comprise media of multiple formats, including music, comedy routines, speeches, audio books, news reports, movies, television shows, photos, home videos, online media items, music videos, movie trailers, audio blogs, live radio stations, among others. An example of such a media player is the Windows® Media Player by Microsoft Corporation of Redmond, Wash.

Referring again to FIG. 1, the selecting filter 45 of the system 31 is adapted to generate a subgroup 85 of media items from the library 65 of media items. The processor 41 configures or chooses the selecting filter 45 based upon one or more monitored user playback control actions 75. The configured or chosen selecting filter 45 is applied to the library of media items 65 to filter out those media items that are unwanted. In one example, the selecting filter 45 may comprise two or more filters, whereby each of the two or more filters is based upon a corresponding user playback control action 75. If a user 71 skips ahead without listening to a first media item and increases the volume of the next played, or second, media item, the processor 41 assigns a filter to each user action. The first filter might decrease the likelihood of including the first media item in the playlist, while the second filter might increase the likelihood of including the second media item within the playlist. It should be noted here that in many examples, there may be more than two filters, and the present example utilizes two for simplicity. In addition, many of such filters may be based upon both past and present user behavior. Additional user actions and corresponding filters are explained in greater detail below.

In addition, the processor 41 may further choose one filter of the selecting filter 45 based upon the combination of two or more monitored user playback control actions 75. In one example, skipping a media item 81 may cause the processor to choose a filter 45 limiting play of that media item. If another media item 81 by the same artist is skipped, the processor 41 may choose a filter 45 limiting play of media items by that artist, based upon the combination of the two skipped media items 81 by the same artist.

Just as the processor 41 can add additional filters to the selecting filter 45, the processor can also remove one or more of the filters of the selecting filter based upon the monitored user playback control action 75. In one example, the processor 41 might remove a filter blocking play of a particular media item if the user 71 later repeats play of the particular media item. As such, the processor 41 can continuously evaluate the filters of the selecting filter 45 based upon the monitored user playback control actions 75 so that the playlist remains reflective of user preferences, even during playback of the media items on a media player. Furthermore, rather than removing or adding one or more filters, the user behavior may be used as inputs to modify one or more existing selecting filters 45. In one example, a selecting filter designed to avoid songs that sound like a particular artist (or photos of a certain subject, recorded television shows featuring a particular actor, etc.) may be modified based upon a user 71 skipping a particular media item to bias against media items similar to the one skipped.

Once the selecting filter 45 selects the media items 81 for the subgroup 85, the ordering filter 51 orders the media items into an ordered subgroup 91 for presentation to the user for playing. The processor 41 configures or chooses the ordering filter 51 based upon the monitored user playback control actions 75 to order the subgroup 85. Like the selecting filter 45, the ordering filter 51 may comprise two or more filters. The processor 41 may also remove one or more of the two or more filters based upon the monitored user playback control action 75. As with the selecting filter, the processor 41 may further configure or choose one filter of the ordering filter 51 based upon the combination of two or more monitored user playback control actions 75. As with the selecting filter 45, the user behavior may also be used as inputs to modify one or more existing ordering filters 51.

The user interface 55 is adapted for presenting the user 71 with the ordered subgroup 91 of media items selected by the selecting filter 45 for viewing and playback 95 on the media player program. Such an ordered subgroup 91 may also be referred to as a playlist throughout the present application. The processor 41 is adapted to continuously generate the subgroup 85 of media items and order the subgroup into an ordered subgroup 91 during the playing of the subgroup on the media player through the user interface 55. This ensures that the user playback control actions 75 are immediately reflected in the ordered subgroup 91. In one example, if the user playback control actions 75 indicate an interest in a particular artist, the selecting filter 45 will increase the number of media items 81 by that artist in the subgroup 85 and the ordering filter 51 will order the subgroup with an emphasis on playing media items by that artist near the beginning of the ordered subgroup 91. Both of these changes are reflected in the ordered subgroup 91 during media playback 95 of the media items in the media player, enhancing the responsiveness of the system 31 to user preferences. In another example, these updating features may be turned off during playback, such that updating of the ordered subgroup 91 only occurs between playback sessions.

Beyond monitoring user playback control actions 75 during the present playback experience of the user, the processor 41 may also rely upon past user playback control actions stored in the memory 61. In this sense, the filters 45, 51 are based upon user playback control actions occurring during either a past playback experience or a present playback experience. This is an important feature, allowing the system 31 to record preferences over time, so that each time the media player is used, the system need not relearn any previously discovered user preferences. In addition, the memory 61 may be further configured to apply to only a particular library 65 or subset of the library. In this manner, the user may determine when and where the stored user playback control actions are utilized.

User Interfaces

Referring generally to FIGS. 2-23, multiple exemplary screenshots of different user interfaces are depicted. In general, each user interface is adapted for presenting the user with metadata relating to the media items playing in the media player. In addition, each of the user interfaces includes one or more selection elements whereby the user can provide feedback directly to the system 31 relating to the media play experience. In a case of listening to music, the selection element may be associated with a media item itself, an artist, an album, or a genre. Based upon the feedback provided by the user, the processor 41 may add, remove, or modify a filter to the selecting filter and/or the ordering filter. One skilled in the art would readily understand that the disclosed user interfaces are exemplary only and may be altered without departing from the scope of the claimed invention.

Figure 2:
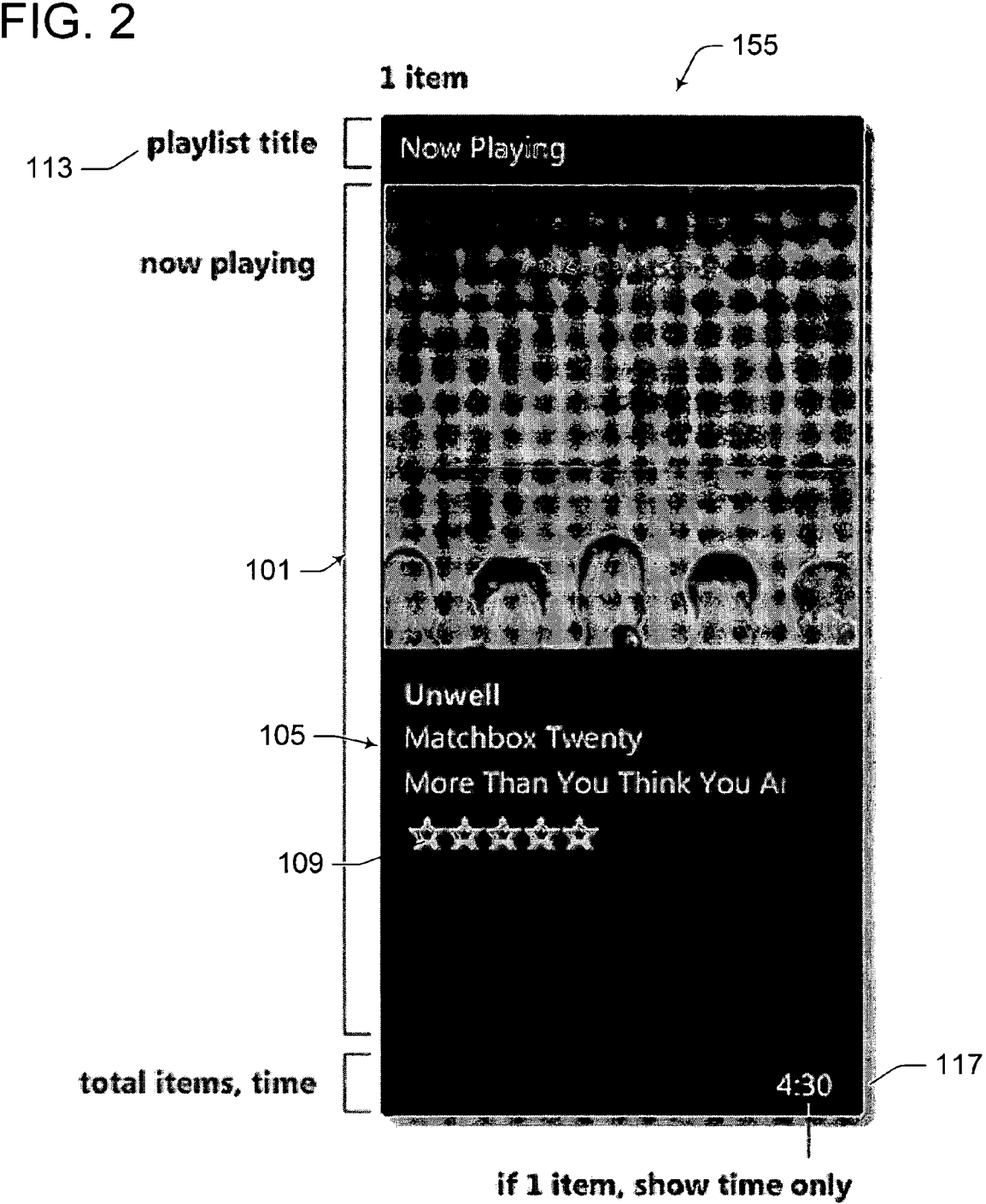
FIG. 2 is an exemplary screenshot of a user interface for a currently playing musical media item.
Figure 3:
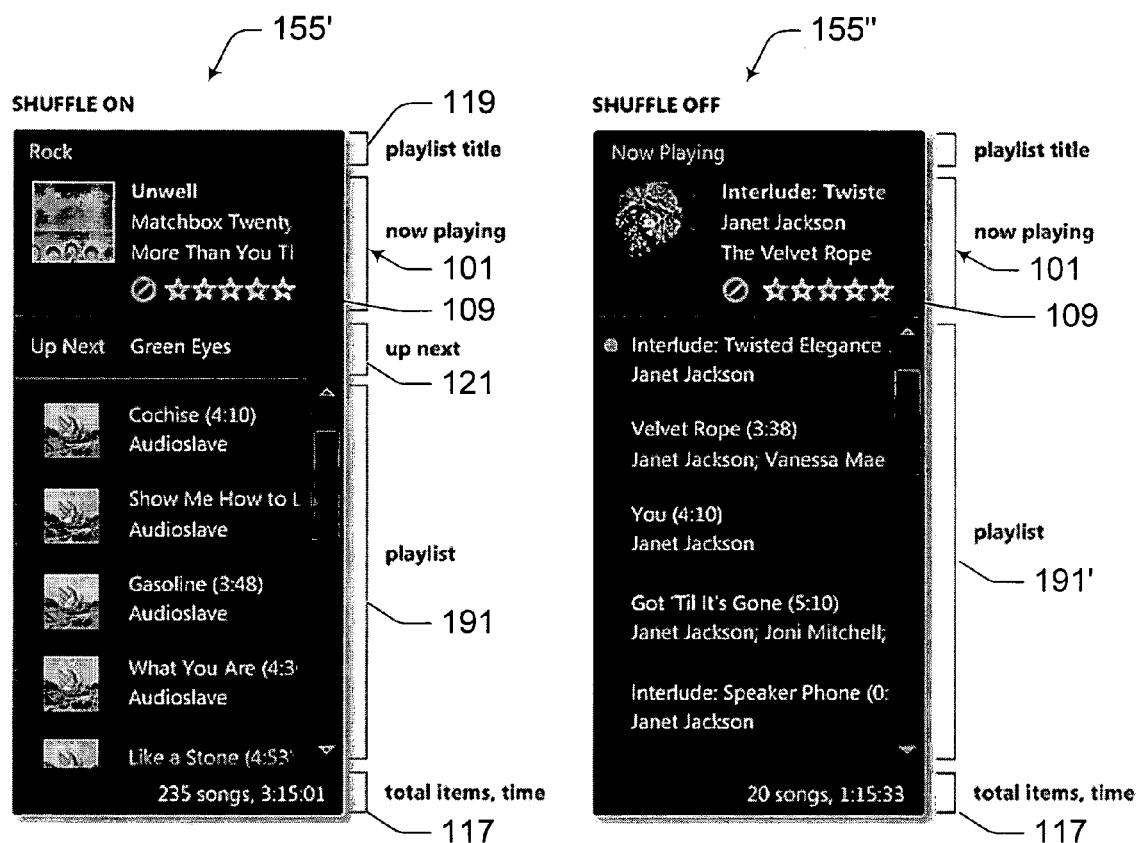
FIG. 3 includes exemplary screenshots of the user interface of FIG. 2 for a shuffled and non-shuffled playlist.
Figure 4:
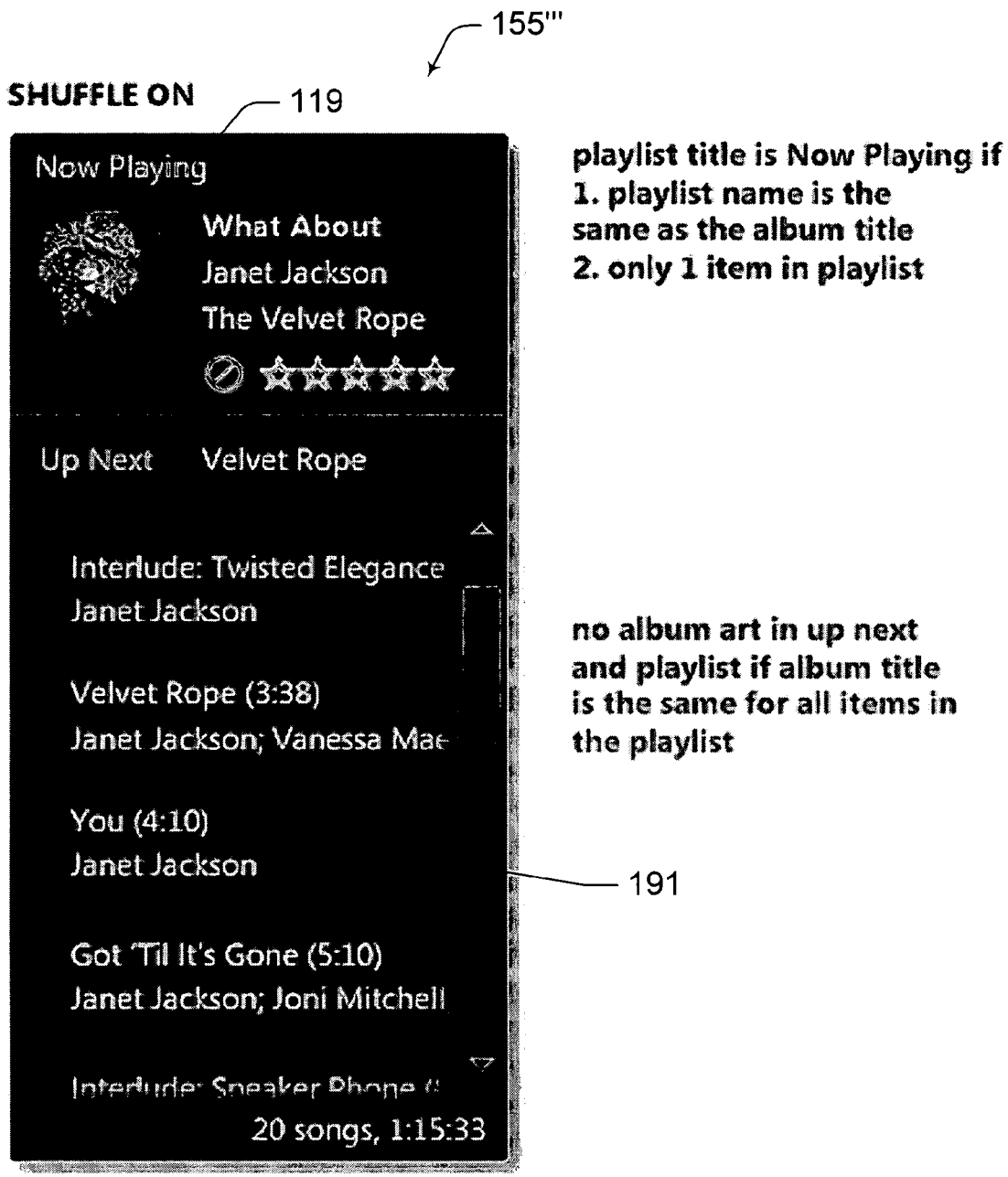
FIG. 4 is an exemplary screenshot of the user interface of FIG. 2 for a shuffled playlist.

Referring now to FIGS. 2-4, exemplary screenshots of a user interface, generally indicated 155, for a currently playing musical media item are shown for shuffled and non-shuffled playlists 191. In particular, FIG. 2 is an exemplary screenshot of the user interface 155 for a currently playing musical media item, generally indicated 101. The user interface 155 provides metadata information, generally indicated 105, related to the currently playing media item 101. In the example of FIG. 2, this metadata 105 includes song name, artist name, album title, and album art information. Moreover, the user interface includes a selection element, a five star scale 109, providing an opportunity for the user to rate the media item. The user interface 155 also provides a playlist title 113 and a total time readout 117. This exemplary user interface 155 provides basic information to the user 71 regarding the currently played media item and the playlist 191, as well as providing a straightforward feedback mechanism for the user.

FIG. 3 includes two exemplary screenshots of the user interface 155 of FIG. 2, the first 155' for a shuffled playlist 191 and the second 155" for a non-shuffled playlist 191'. In particular, the user interface 155' provides a playlist title 119 and additional metadata information related to the currently playing media item 101, the media item to be played next 121, and the entire playlist, or ordered subgroup 191. The currently playing media item 101 includes multiple metadata items, including song name, artist name, album title, and album art information. Moreover, the user interface includes a selection element, a five star scale 109, providing an opportunity for the user to rate the currently playing media item 101. The playlist 191 also includes multiple metadata items, including the name of each media item, the length of each media item, the artist for each media item, and album art for each media item. The user interface 155' additionally includes a readout 117 including the number of media items in the playlist 191 and the total cumulative time of such media items. The user interface 155" is substantially the same as the user interface 111, except that user interface 155" is not shuffled and therefore does not provide the media item to be played next, as the media item to be played next is simply the next item in the playlist 191.

FIG. 4 is an exemplary screenshot of the user interface of FIG. 3 for a shuffled playlist 191. The user interface 155''' of FIG. 4 is substantially identical to the user interface 155" of FIG. 3, except that the playlist title 119 is entitled "Now Playing." This occurs if the playlist name is not saved under any name. Moreover, because each of the media items in the playlist 191 is by the same artist, no album art is included as metadata information for the media items of the playlist.

Figure 5:
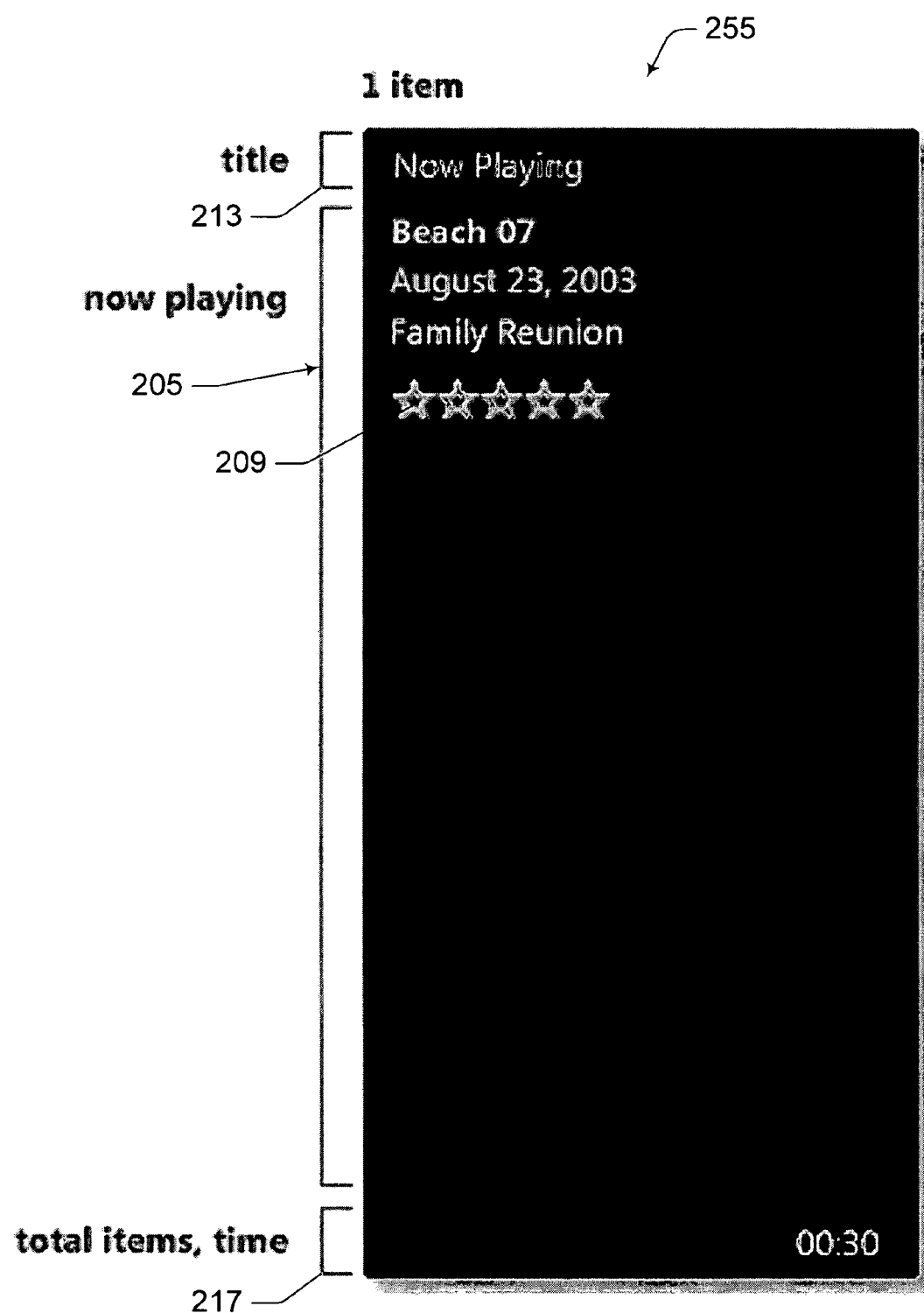
FIG. 5 is an exemplary screenshot of another user interface for a currently accessed subgroup of visual media items.
Figure 6:
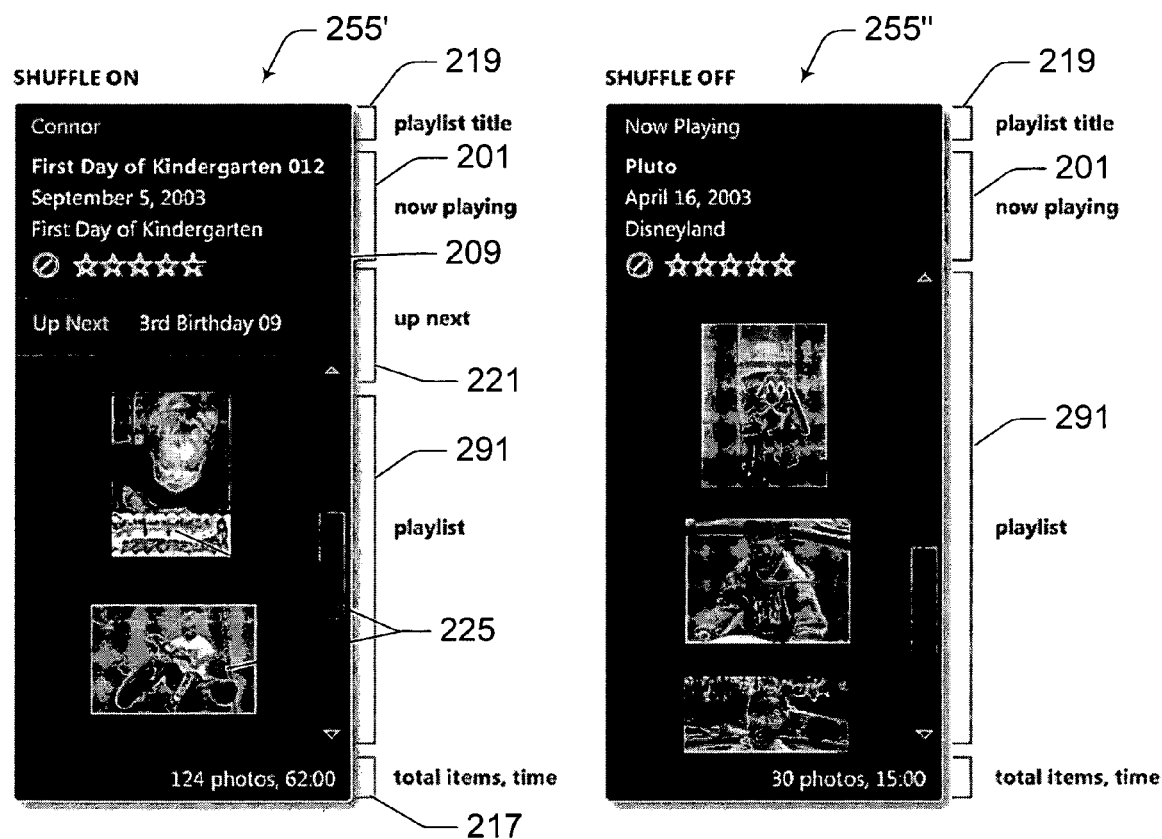
FIG. 6 includes exemplary screenshots of the user interface of FIG. 5 for a shuffled and non-shuffled subgroup.

Referring now to FIGS. 5 and 6, exemplary screenshots of a user interface, generally indicated 255, similar to those of FIGS. 2-4, for a currently accessed subgroup of visual media items. In particular, the user interface 255 depicted is for a user organizing several photographs for viewing through the interface. As with the previous user interfaces 155, the present user interface 255 provides metadata information, generally indicated 205, related to the media items, including photograph name, photograph date, and album name. Moreover, the user interface 255 includes a selection element, a five star scale 209, providing an opportunity for the user to rate the media item. The user interface 255 also provides a playlist title 213 and a total time readout 217.

FIG. 6 additionally includes exemplary screenshots of the user interface 255 for shuffled and non-shuffled subgroups of media items. These user interfaces 255 are substantially similar to the user interfaces 155 of FIG. 3 discussed above. In particular, the shuffled user interfaces 255' provide a playlist title 219 and additional metadata information related to the currently playing media item 201, the media item to be viewed next 221, and the entire playlist, or ordered subgroup 291. The currently viewed media item 201 includes multiple metadata items, including photograph name, photograph date, and album title. Moreover, the user interface 255' includes a selection element, a five star scale 209, providing an opportunity for the user to rate the currently accessed media item, or photograph. The playlist 291 also includes a thumbnail photograph 225 for each media item. The user interface 255' additionally includes a readout 217 including the number of media items in the playlist 291 and the total cumulative time of such media items. The user interface 255" is substantially the same as the user interface 255', except that user interface 255" is not shuffled and therefore does not provide the media item to be viewed next, as the media item to be viewed next is simply the next item in the playlist 291.

Figure 7:
FIG. 7 is an exemplary screenshot of yet another user interface for a playlist of musical media items.

Referring now to FIGS. 7-10, exemplary screenshots of a further user interface, generally indicated 355, for a currently playing musical media item is shown. In particular, FIG. 7 is an exemplary screenshot of the user interface 355 providing metadata information, generally indicated 305, related to the currently playing media item, generally indicated 301. In the example of FIG. 7, this metadata 305 includes song name, artist name, album title, and album art information. Moreover, the user interface includes a selection element, a five star scale 309, thereby providing an opportunity for the user to rate a particular media item 301. The user interface 355 includes an additional selection element, a graphic 333, for providing an opportunity for the user to provide additional feedback regarding the currently played media item 301. In contrast to the five star scale 309, however, the graphic 333 provides the user with an opportunity for more general feedback regarding how other media content relates to the currently played media item 301, rather than simply rating the currently played media item. In the example shown, the graphic 333 includes a smiling face and a frowning face, although other graphics are also contemplated as within the scope of the claimed invention.

Figure 8:
FIG. 8 is an exemplary screenshot of the user interface of FIG. 7 with a selection element engaged.

Referring more particularly to FIG. 8, a mouse pointer 337 hovers over the selection element 333, thereby revealing the result of selecting the smiling face, namely "Play more by this artist." Conversely, selection of the frowning face will indicate the preference of "Play less by this artist." The graphic 333 provides a relatively simple and straightforward way for the user to indicate his preference with respect to the currently played media item 301. As discussed above, selection of the smiling face or the frowning face of the graphic 333 is monitored by the processor 41 for configuring or choosing an appropriate selecting filter 45 and/or ordering filter 51 corresponding to the user instructions for application to the library 65 of media items.

Figure 9:
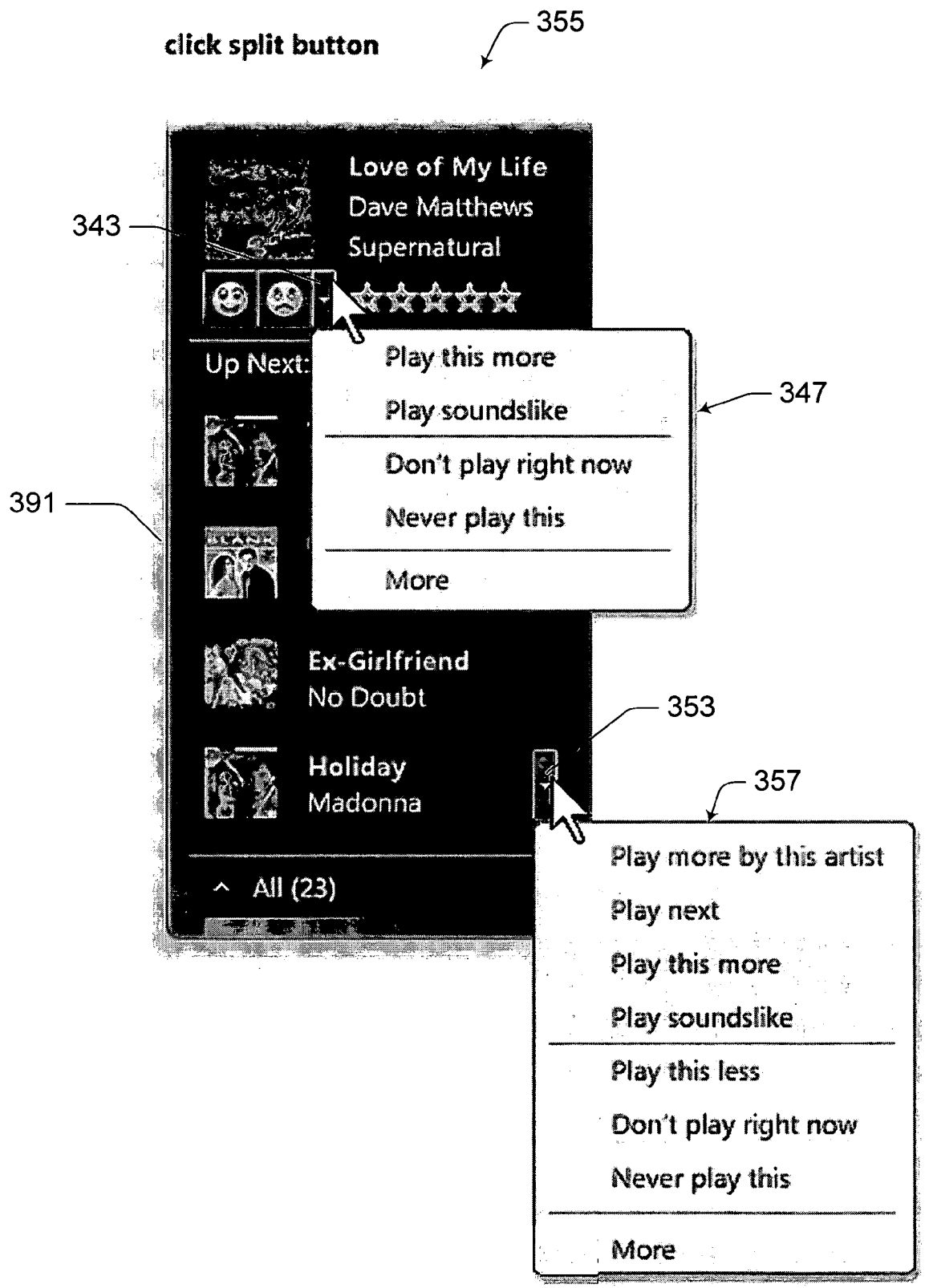
FIG. 9 is an exemplary screenshot of the user interface of FIG. 7 with additional selection elements engaged.

Beyond the binary choice offered by the smiling face and frowning face graphic 333, a user seeking to communicate more specific user preferences to the system 31 can select a split button 343 associated with the graphic 333 to reveal a broader array of instructions. As shown in FIG. 9, selection of the split button 343 reveals a selection list, generally indicated 347. The selection list includes the following choices:

Play this more;
Play soundslike;
Don't play right now;
Never play this; and
More.
Each of the choices offered by the selection list 347 relates to the media item currently played by the media player. As discussed above, selection of any one of these choices of the split button 343 is monitored by the processor 41 for configuring or choosing an appropriate selecting filter 45 and/or ordering filter 51 corresponding to the user instructions for application to the library 65 of media items. In particular, selection of "More" will reveal additional choices, as would be understood by one skilled in the art. One skilled in the art would understand that this selection list 347 is exemplary only and that other choices may be added or removed without departing from the scope of the claimed invention. The relationship between each of the choices and the selected filters will be discussed in greater detail below.

Referring again to FIG. 8, the user interface 355 provides an additional selection element, a split button 353, associated with each media item of the playlist 391. A user seeking to communicate more specific user preferences to the system 31 can select the split button 353 associated with a particular media item to reveal a broader array of instructions. As shown in FIG. 9, selection of the split button 353 reveals a selection list, generally indicated 357. The selection list includes the following choices:

Play more by this artist;
Play next;
Play this more;
Play soundslike;
Play this less;
Don't play right now;
Never play this; and
More.

Each of the choices offered relates to the media item in the playlist 391 adjacent the split button 353. As discussed above, selection of any one of these choices of the split button 353 is monitored by the processor 41 for configuring or choosing an appropriate selecting filter and/or ordering filter corresponding to the user instructions for application to the library of media items. In particular, selection of "More" will reveal additional choices, as would be understood by one skilled in the art. One skilled in the art would also understand that this listing is exemplary only and that other choices may be added or removed without departing from the scope of the claimed invention. The relationship between each of the choices and the selected filters will be discussed in greater detail below.

Figure 10:
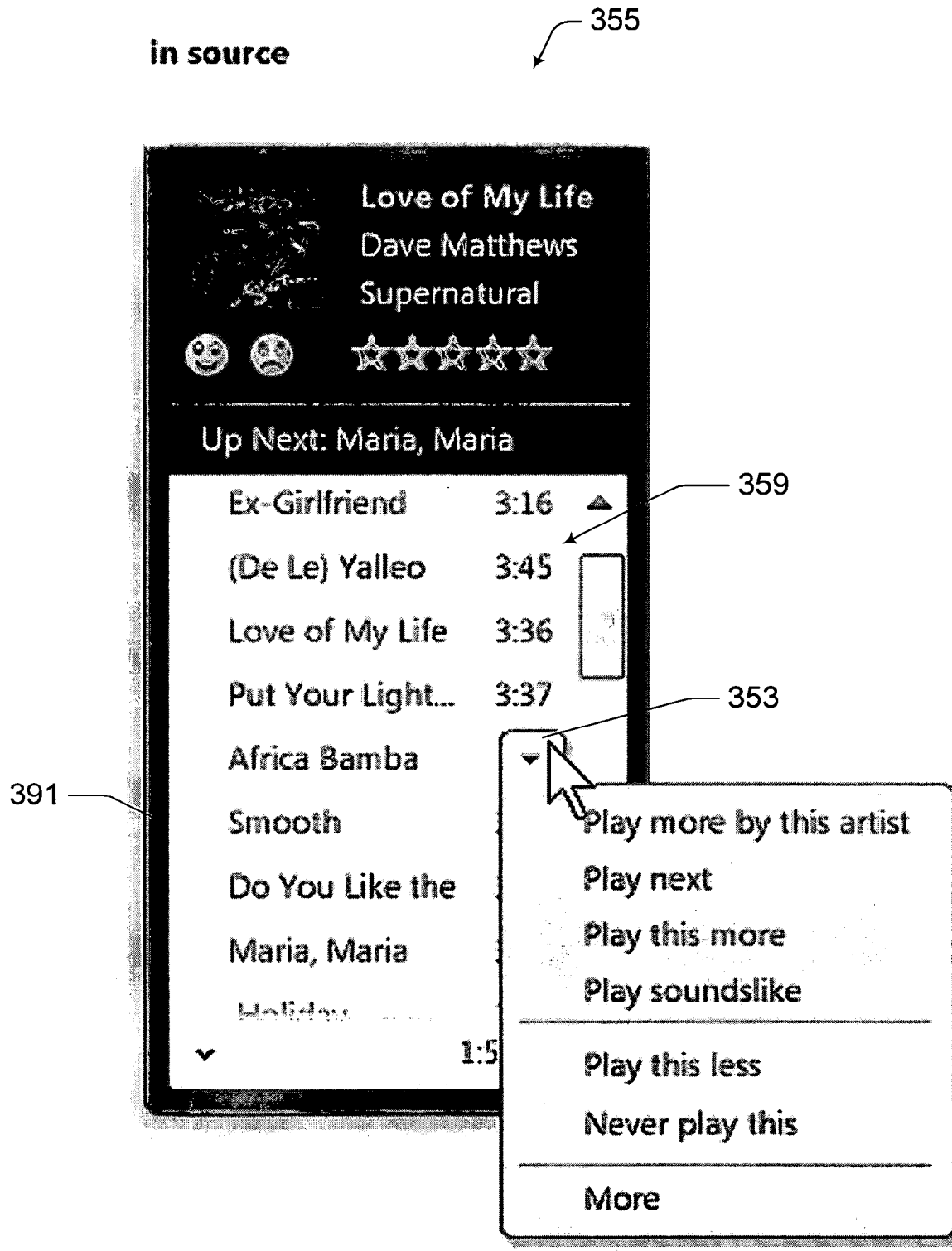
FIG. 10 is an exemplary screenshot of the user interface of FIG. 7 with an alternate playlist view and additional selection elements engaged.
Figure 13:
FIG. 13 is an exemplary screenshot of the user interface of FIG. 11 with additional selection elements engaged.
Figure 14:
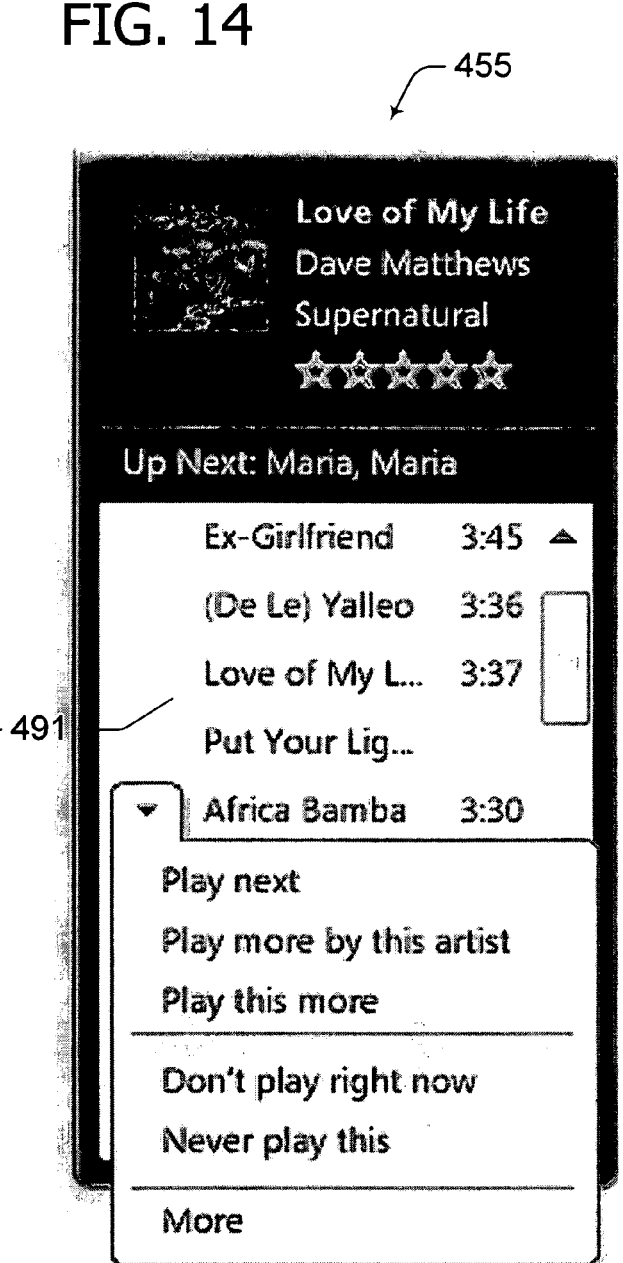
FIG. 14 is an exemplary screenshot of the user interface of FIG. 11 with an alternate playlist view and additional selection elements engaged.
Figure 15:
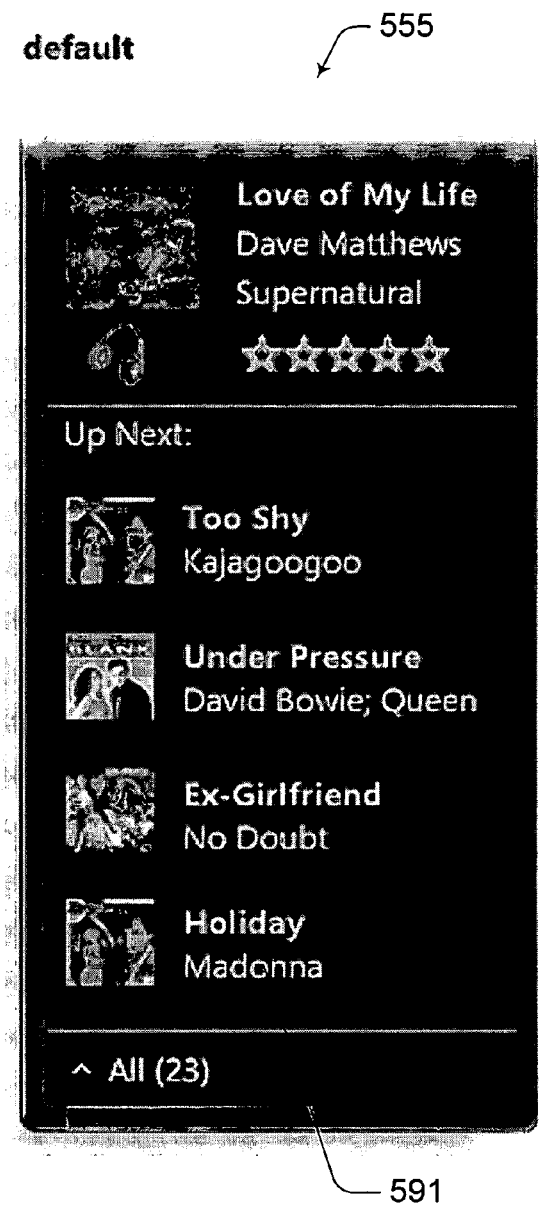
FIG. 15 is an exemplary screenshot of another user interface for a playlist of musical media items.
Figure 16:
FIG. 16 is an exemplary screenshot of the user interface of FIG. 15 with a selection element engaged.
Figure 17:
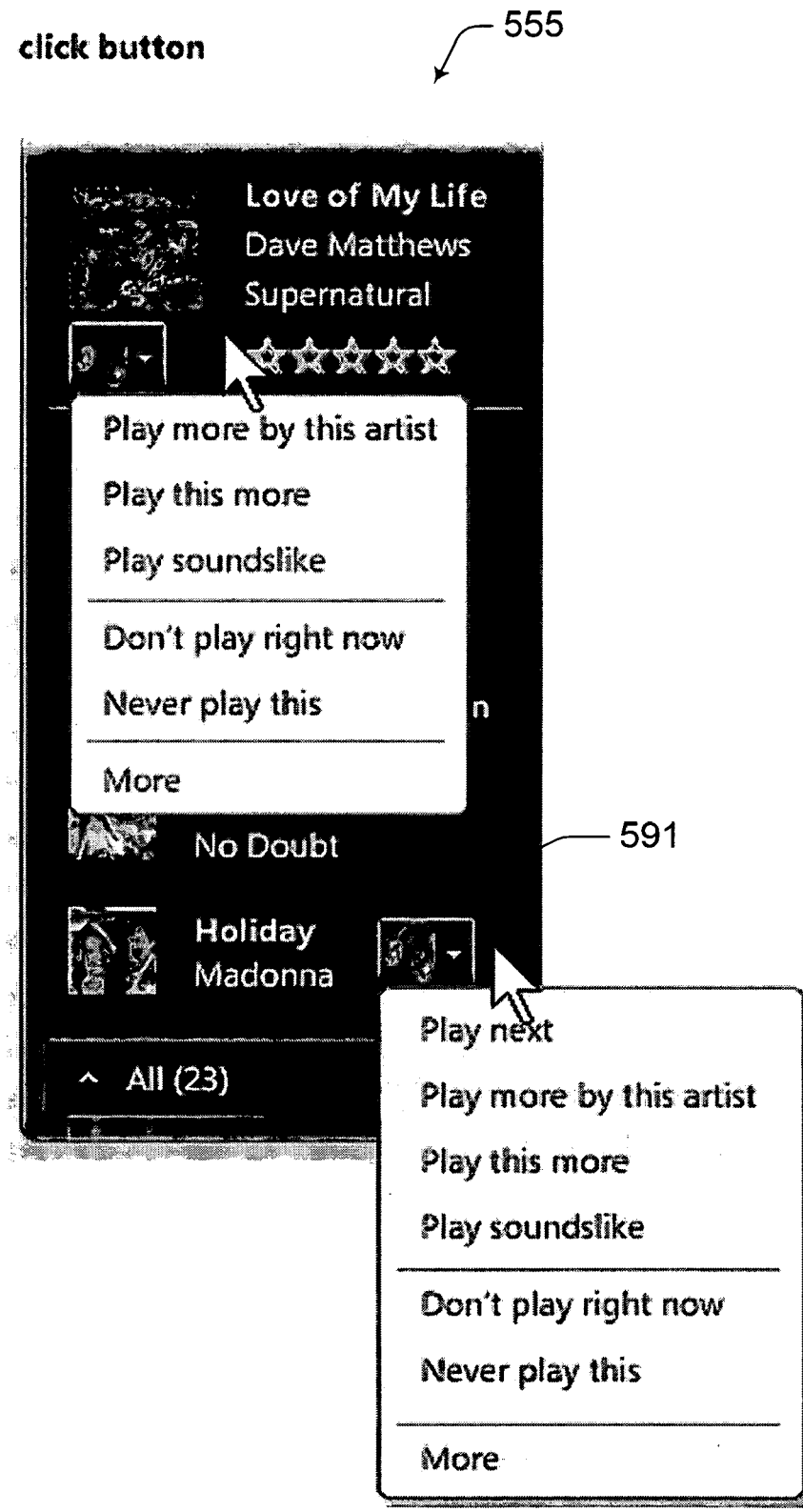
FIG. 17 is an exemplary screenshot of the user interface of FIG. 15 with additional selection elements engaged.
Figure 18:
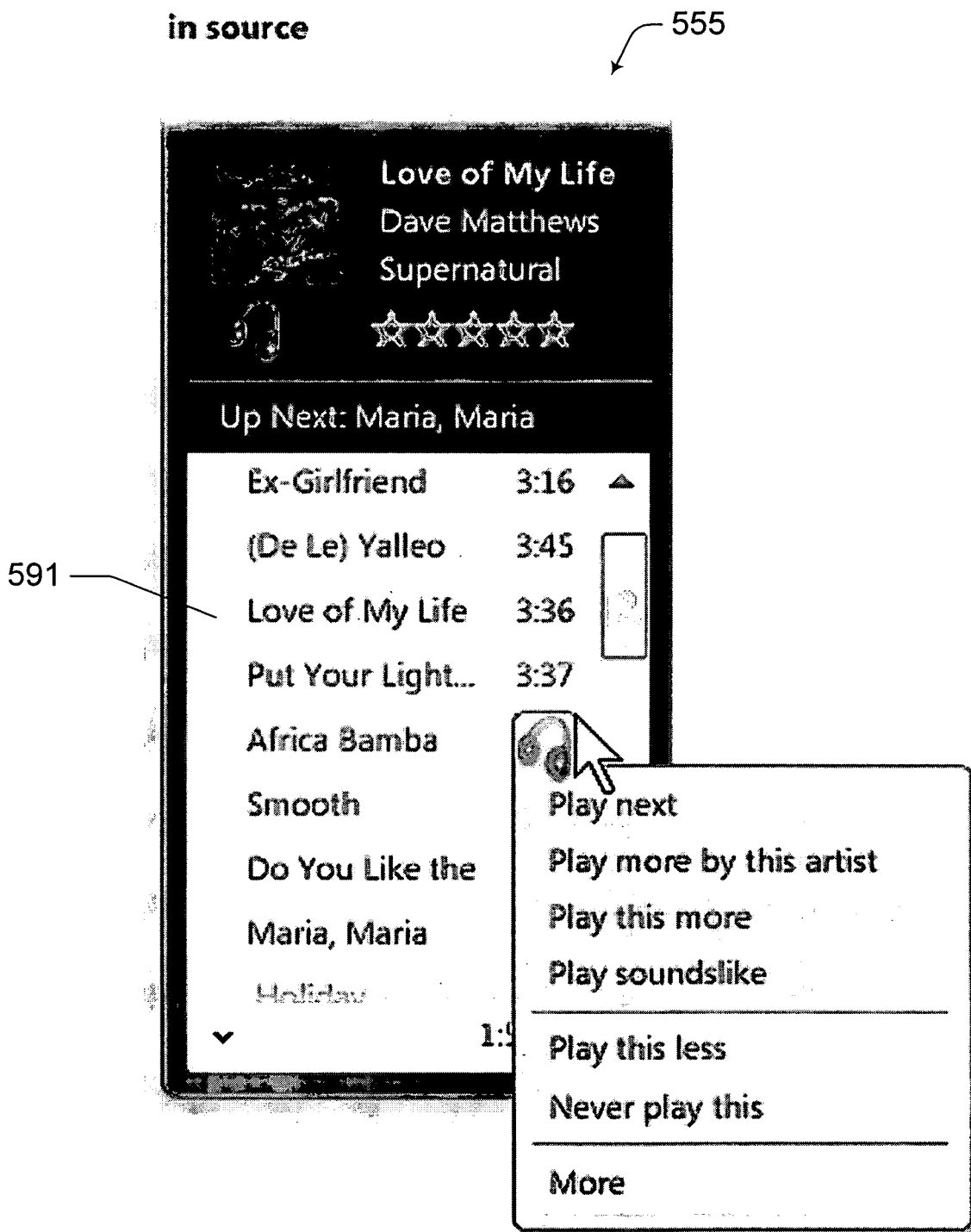
FIG. 18 is an exemplary screenshot of the user interface of FIG. 15 with an alternate playlist view and additional selection elements engaged.

Referring now to FIG. 10, the user interface 355 includes an alternate library view, generally indicated 359, of the entire library 65 of media items 81, rather than only a portion of the playlist 391. In this library view 359, an additional selection element 363 associated with each media item permits the user 71 provide additional feedback regarding media items in the library to further steer playlist 391 creation. Because the library view 359 presents all of the media items 81 of the library 65 to the user 71, the user can provide feedback on media items not currently in the playlist 391. For example, if a user 71 provides feedback on a particular media item in the playlist 391 by artist U2, instructing "Don't play songs like this," the system 31 may remove media items by artist U2 and artist R.E.M. from the playlist because the system judges media items by artist U2 and artist R.E.M. as similar. If the user 71 disagrees with this judgment, and wishes to keep media items by R.E.M. in the playlist 391, the user can switch to the library view 359 and utilize the additional selection element 363 associated with a media item by artist R.E.M. to effectively override the decision of the system 31 by selecting "Play songs by this artist" for artist R.E.M. Because the "Play songs by this artist" was the last preference, and therefore the last filter applied, the system 31 will then add media items by artist R.E.M. back into the playlist 391, while retaining all earlier preferences, including the preference for not playing media items that sound like artist U2, except for media items by artist R.E.M. In other respects, the user interface 355 of FIG. 10 is substantially the same as the user interface depicted in FIG. 9.

Referring now to FIGS. 11-14, another user interface, generally indicated 455, of the present invention is shown. The user interface 455 is substantially similar to user interface 355 of FIGS. 7-10, except that the selection element, a split button 433, is associated with the album art of the media item, rather than with the separate graphic (e.g., 333 of FIG. 8). In other respects, the user interface 455 is similar to those described above.

Referring now to FIGS. 15-18, another user interface, generally indicated 555, of the present invention is shown. The user interface 555 is substantially similar to user interface 455 of FIGS. 11-14 in that a selection element, a split button 533, is associated with each media item, including those in the playlist 591. In addition, the split button 533 includes a graphic, similar to the user interface 355 of FIGS. 7-10, except that the graphic does not include a binary choice. Instead, the user must utilize the split button 533 to provide any feedback. In other respects, the user interface 555 is similar to those described above.

Figure 21:
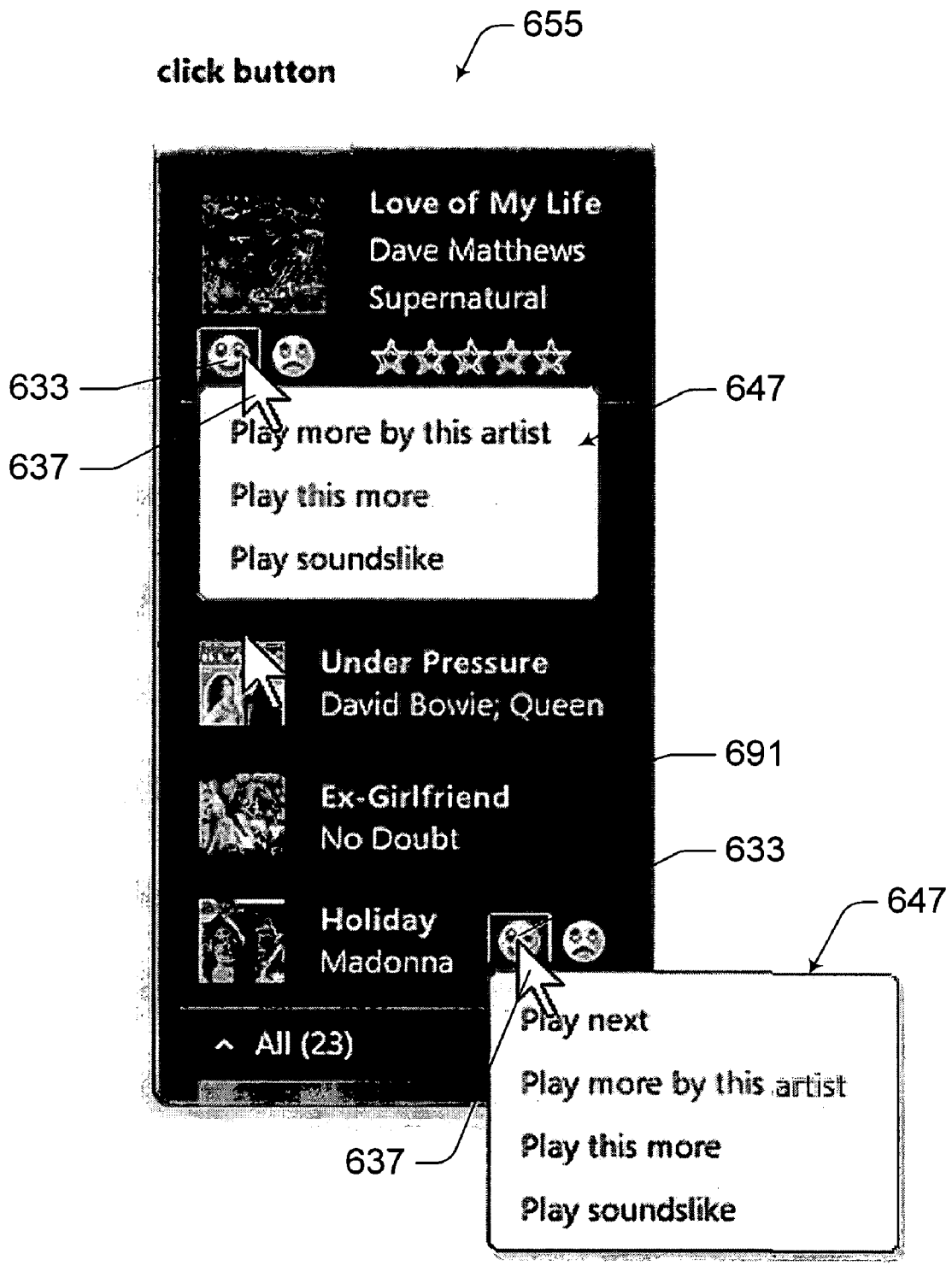
FIG. 21 is an exemplary screenshot of the user interface of FIG. 19 with additional selection elements engaged.

Referring now to FIGS. 19-23, another user interface, generally indicated 655, of the present invention is shown. The user interface 655 combines several features of the user interfaces 355, 455, 555 described above. In particular, both the media item currently playing and those media items in the playlist 691 are associated with selection elements 633 that provide an opportunity for the user to give additional feedback regarding the respective media item (e.g., see the user interface 433 of FIGS. 11-14). In addition, each selection element 633 includes a graphic, a smiling face and a frowning face, for indicating preferences with respect to the associated media item (e.g., see the user interface 333 of FIGS. 7-10). It should be noted here that other graphics are also contemplated as within the scope of the claimed invention. As shown in FIGS. 21 and 23, clicking a mouse pointer 637 over the smiling face displays a positive selection list, generally indicated 647, of feedback choices, each positively associated with the media item. The positive selection list 647 may vary slightly between the currently played media item and the media items of the playlist 691; in one example, the positive selection list of the playlist media items may include a selection of "Play next" to move the respective media item to the top of the playlist. Similarly in FIG. 22, clicking the mouse pointer 637 over the frowning face displays a negative selection list, generally indicated 657, of feedback choices, each negatively associated with the media item.

Other user interfaces different from those described above are contemplated as within the scope of the claimed invention.

Filter Mappings for Selection Elements and User Actions

With the exemplary user interfaces described above, the selection elements include multiple feedback choices available to the user. In one example, selection elements associated with particular media items may include the following choices: play this more; play soundslike; don't play right now; never play this; play more by this artist; play next; play this more; and play this less. In the present system, each of such selection elements is associated with the addition, removal, or modification of one or more filters by the system. In this manner, the user can direct the listening experience by making selections while the system configures or chooses appropriate filters. In one example, the following generic selection elements will cause the system to invoke the associated filters according to the following table:

| Selection Element | Associated New Filter |
| --- | --- |
| Play media items by this artist | Append a new "Artist is" filter |
| Play media items from similar artists | Append a new "Artist is Similar" filter |
| Play media items from this album | Append a new "Album is" filter |
| Play media items within this genre | Append a new "Genre is" filter |
| Play media items that are more quiet | Append a new "DSPEnergy is LOW" filter |
| Play media items that are more energetic | Append a new "DSPEnergy is HIGH" filter |

Taking a more specific example, for a user selection of a selection element of "play media items by David Bowie," an "Artist is David Bowie" filter is added to the selection filter. That filter will encourage media items associated with David Bowie to pass through the selection filter and become part of the current subgroup of media items. After adding one or more these filters to the selection filter, the subgroup is reevaluated by the system, new media items are added to or removed from the subgroup, the subgroup is ordered, and the user interface will reflect the changes. These changes can take place contemporaneously with the playing of the media items, such that the user can see the playlist change immediately after selecting a particular selection element. In another example, selection of the "play this less" selection element results in similar filter selections, but with opposite indications, thereby discouraging inclusion of associated media items within the subgroup.

Like the selection elements discussed above, the monitored user control actions 75 may comprise any interaction between the user 71 and the media player through the user interface 55. While the user 71 accesses media items, such as music files, the user may control the media player to alter the listening experience. In one example, when a media item that the user particularly enjoys begins playing, she may choose to increase the volume on the media player. If an undesirable media item is played, she may decide to skip to the next media item. Although not intended to provide information to the system regarding listening preferences, each of these media player control actions does provide valuable information about a user's musical taste or current mood. With conventional media players, preferences communicated through such media player control actions are typically ignored, and only explicit actions by the user, such as altering the rating on a media item or artist, are recorded and utilized. By monitoring these user control actions, the user indirectly instructs the processor regarding a wide variety of preferences, without requiring any additional effort or knowledge on the part of the user. Monitoring and utilizing this information is particularly useful for a user who would enjoy a more tailored listening experience, but does not wish to put forth the effort to create a playlist of media items from the library.

With these types of user control actions in mind, an exemplary system can monitor the following user control actions and apply these actions to the media items in the library to select and order a subgroup according to the following table:

are monitored, such actions may be combined to configure or choose appropriate filters. Other actions and assumed desires not listed here are also contemplated as within the scope of the claimed invention. Moreover, some user behaviors may be monitored by the system to determine if a user is considered "proactive." For example, if the user 71 is controlling playback by skipping media items, selecting other media items to play, adding media items, and reordering media items, they may be considered to be proactively controlling the playback of the playlist 91. In this situation, the system 31 may limit the addition, removal, and modification of many of the filters based upon user feedback because the user 71 is putting forth some effort in "steering" their own experience. If the user 71 is more passive (e.g., occasionally rating a media item and occasionally skipping a media item) the system 31 may add more filters, in an effort to further design the playlist 91 to meet the needs of the user.

The user control actions discussed above are generally related to actions that directly control playback of media items upon the media player. The following table lists user control actions that are also useful in generating the subgroup

| USER ACTION | ASSUMED DESIRE |
| --- | --- |
| Pressing "PLAY" on the user interface without the media player running | "Start playing music for me"; Passive music listener |
| Pausing a playing media item | Something is going on; wait for me because I like this media item |
| Muting a playing media item | Something is going on; don't wait as I don't really care what media item is playing |
| Skipping to the next media item | Don't feel like listening to this media item right now (if rated highly) or I don't like this media item (if unrated/rated low) |
| Seeking to the end of a media item | Don't feel like this media item right now (if rated highly) or I don't like this media item (if unrated/rated low) |
| Seeking to the beginning of a media item | I like this media item and want to hear it again |
| Skipping to a previous media item | I like this media item and want to hear it again |
| Stopping the media player while playing a media file | No assumed desire |
| Closing the media player | No assumed desire |
| Skipping two media items by the same artist | Don't feel like this media item right now (if rated highly) or I don't like this media item (if unrated/rated low) |
| Skipping three media items by the same artist | Don't feel like this media item right now (if rated highly) or I don't like this media item (if unrated/rated low) |
| Skipping a media item from a single album twice | Don't feel like this media item right now (if rated highly) or I don't like this media item (if unrated/rated low) |
| Skipping a media item from a single album three times | Don't feel like this media item right now (if rated highly) or I don't like this media item (if unrated/rated low) |
| Lowering the rating of a media item | I now like this less (this media item, maybe this album) |
| Raising the rating of a media item | I now like this more (this media item, maybe this album) |
| Lowering the rating of two media items from the same artist or album | I now like this less (this media item/this album, maybe this artist) |
| Raising the rating of two media items from the same artist or album | I now like this more (this media item/this album, maybe this artist) |
| Rating a previously unrated media item | I am making a point of saying that I like (this media item, maybe this artist/album) |

As discussed above, monitoring any one of the above user actions may invoke the addition of one or more corresponding filters. In addition, if two or more of the user control actions of media items, but are generally less direct than the user actions noted above. This does not, however, limit the ability of these actions to correctly assign appropriate filters.

| USER ACTION | ASSUMED DESIRE |
|---|---|
| Minimizing the media player | I am a passive listener |
| Maintaining the media player on top of the user interface | I am an active listener |
| Selecting to view media items now playing | I am an active listener |
| Browsing the library of media items | I am a very active listener |
| Adding a media item to the playlist while another media item is playing | I am a very active listener |
| Browsing media item merchants through the user interface while playing media items | I am in a music discovery mood - shuffle things up for me. |
| Changing a visualization associated with the media player | I am an active listener |
| Displaying a Metadata view for the currently playing media item | I am interested in this media item |
| Raising media player volume within five seconds of the beginning of a media item | I am interested in this media item |
| Lowering media player volume within five seconds of the beginning of a media item | I am less interested in this media item |
| Total playcount of media item exceeds top 10% of media items | I am interested in this media item |
| Total playcount of media item exceeds top 25% of media items | I really like this media item |
| Total playcount of media item exceeds top 50% of media items | I LOVE this media item |
| Adding a media item to the subgroup | I like this media item |
| Burning a media item to a redbook CD | I like this media item a lot (or someone I know does) |
| Initiating user control actions at least N times in a time interval T | I am an active listener |
| Creating a relatively small library with relatively many genres | I have eclectic taste |
| Creating a relatively large library with relatively few genres | I know what I like, and it's <insert genre> |
| Creating a relatively large library with relatively many genres | May suggest an eclectic taste |
| Initiating user actions at least X times in time S | If large number, then "I like this media item while working", if low . . . not so much meaning |

As with the previous filters, if the processor 41 monitors two or more user control actions 75, the two or more actions may be combined to configure or choose appropriate filters.

The selecting filters may be of various types, including the following filters and corresponding explanations of their uses:

| SELECTING FILTER | SELECTING FILTER ACTION |
|---|---|
| Album-based | Make selection Album-based, rather than media item based via averaging filters over the album for the overall album rating. |
| Avoid speech/comedy media items | If possible to detect in media item, bias against those media items that do not have backing music (mono, low bit rate, narrow frequency band, etc.) |
| Bias by current date | Select the next media item based upon the current date and the release date of the media item (as well as well-known seasonal music). |
| Bias by day of week | Select media items that are commonly played on this day of the week. Use weekend vs. weekday playcount in the media player. |
| Bias by favorite content | Play favorite content more often than not. Relies upon star ratings (user, community, service-provided, or playcount generated). |
| Bias by household favorites | Favor media items that others on the same computer like (or favor away from those media items). |
| Bias by manual user avoidance | Favor against media items that sound like the last N media items the user manually showed dislike to (implicitly or explicitly). |
| Bias by manual user selection | Favor media items that sound like any of the last N media items the user manually selected to play (more closely match the style the user is looking for). |
| Bias by play popularity | Play content that has a higher playcount. Source data comes from community, service-provided, or playcount generated. |

| SELECTING FILTER | SELECTING FILTER ACTION |
| --- | --- |
| Bias by time of day | Selects media items that are commonly played at this time of the day. Uses morning/afternoon/evening/night playcount in the player |
| Burning | Favor media items (or bias against) that user has picked to burn to a redbook CD. |
| Does not sound like | Uses artist similarity vectors to prevent selection of music similar to a given artist |
| Exclude holiday music | General filter that removes holiday music from media item selections (e.g., fixed metadata keyword searches on key fields). |
| Greatest hits mode - album | Include only the top N media items from each album that meet "good" criteria. |
| Greatest hits mode - artist | Include only the top N media items from each artist that meet "good" criteria. |
| Library compendium CDs | Builds a series of sequential playlists, each the maximum allowed for redbook audio CDs, which provides short samples of every media item in the library for burning to a CD. |
| Library samplers | Builds a playlist that is the maximum that will fit on a Redbook audio CD (99 media items) that contains sample snippets of as broad a selection of the library as possible. A library with 99 media items would have all of them, while a library with 198 media items would try to pull a complete representative sample from half of them (rather than the first 99 in some flat list). |
| Not recently played | Prevents something recently played from being played again. Most important on very large playlists (e.g.: Genre = rock) |
| Same energy | Seeks to match energy of a media item (e.g. Aerosmith rock ballad seed media item, do not add death metal media items). Uses DSP produced Hi/med/low output value from CD ripping process or metadata download. |
| Same era | Plays content within known musical periods as defined by inflection points within music industry (fixed metadata: e.g.: Flappers = 20 s) |
| Same genre | Use genre field to bias music selection to be within a given genre. |
| Same mood | Use genre field to bias music selection to be within a given mood. |
| Skip one star rated media items | Skip media items having a one star rating. |
| Skip parental rating | Skip media items that have a non-friendly parental rating (a switch to switch the media player into a "clean" mode). |
| Skip sound-bytes | Favor heavily away from things that don't look like simple songs (e.g., short clips, or very long sets). Potentially other triggers as well. |
| Media items not device-based | Favor media items that are (or are not) on my device (e.g., in my library). |
| Sounds like | Uses artist similarity vectors to ensure selection of music similar to a given artist |
| User action bias filter | Inclusion percentage based upon an overall user bias field discerned from multiple potential user actions: (e.g.: play count, media item skips, increasing the volume, explicitly double-clicking on a media item, frequently playing from an album/genre/artist/mood, and any other user-biases discerned). This includes biasing towards what is believed to be desirable and away from what is believed undesirable based upon the data. |

One skilled in the art would readily understand that other filters may be utilized without departing from the scope of the claimed invention.

The ordering filters may be of various types, including the following filters and corresponding explanations of their uses:

| ORDERING FILTER | ORDERING FILTER ACTION |
| --- | --- |
| Artistic Filter | Attempts to create an entirely new and interesting music experience by playing and replaying subsections of media items, interleaving portions of different media items |
| Kid Filter A | Plays favorite media items over and over but tries to drag in new choices occasionally to widen the child's taste |
| Kid Filter B | (Variation on Kid Filter A) Does not automatically play media item multiple times, but rather plays favorite (often the first media item selected) and then queues another media item for playback after. If the child runs over and hits Previous, then we |

-continued

| ORDERING FILTER | ORDERING FILTER ACTION |
| --- | --- |
| | know they didn't like what we had queued, so we try something else. If they eventually let the second media item play without hitting Previous, we rate it as a tentative new favorite |
| Kid Filter C | Shuffles kids music and allows certain media items to be played only N times per day |
| Kid Filter D | Shuffles kid music (or any genre, artist, or sub-filter selected) for preselected length of time (say 30 minutes), lowering the energy of the media items and the actual player volume in an effort to lull them to sleep |
| Library Preview | Randomizes as thoroughly as possible across all vectors (artist, genre, etc) and plays 15 second clips of each media item until the user hits the Previous button to return to one that sounded interesting, at which point it switches to the default shuffle filter (or a previous shuffle filter, or a filter that is focused on the genre/release date/etc of the "interesting" media item picked out by the user. |
| Balance Artists | Attempts to balance the Artist ratio being output (thus allowing collections heavily biased with a single artist to not have that artist dominate all playback) |
| Bias by Current Time | Picks the next media item (e.g., song or photo) based on the time of day and your listening habits of that time of day. Note this is fundamentally different from a selection filter because it re-evaluates the current time as it runs. Sort of an auto-radio station. |
| Discography order | When picking media items, it seeks to pick the oldest (or newest) media items first for each artist. Different than a global "year released" shuffle order because this will still mix up the artists. |
| Don't follow with similar media item | Uses artist similarity vectors to ensure that the next artist is not overly similar to what's currently playing |
| Double-Shots | Force back-to-back tracks from the same artist in the output order and then change artists. |
| Follow with similar | Uses artist similarity vectors to ensure that the next artist is similar to what's currently playing |
| Follow with similar era | Allow year changes, but bias towards years near what is playing (don't let the time period change too quickly) |
| FollowWithNextTrack OnAlbum | Offers a steep preference to the other tracks on the same album (when present) in track order (when possible) |
| Not Recently played | Prevents something recently played from being played again. Helps prevent start/stop of a playlist from recomputing poor shuffle behavior |
| Not Recently played Artist | Prevents the same artist from being continually played (keeps distance between artists just as you would between playing the same track again). |
| Old-vs-New | Attempts to pick the next media item such that the artist similarity vectors are similar, but the year released is as dissimilar as possible. |
| Pure Shuffle | It's really an "accurate shuffle" - Randomize once, play all media items once; repeat as needed |
| Random Shuffle | Fully random shuffle (repeat some media items before all play, but many users like the random effect over a pure shuffle) |
| Release Year | Favors playing back music in the order of release year. |
| Tempo Match. | Attempts to pick the next media item such that it matches the end tempo of currently playing media item with beginning tempo of new media item |

One skilled in the art would readily understand that other selection and/or ordering filters may be utilized without departing from the scope of the claimed invention.

The following examples are included to facilitate understanding of which particular user actions may be mapped to particular filters. These combinations are exemplary only and other combinations are also contemplated as within the scope of the claimed invention. In one example, a user 71 double-clicks directly on several media items in the playlist 91 to play the selected media items now, instead of allowing the next media item in the playlist to be played. In this scenario, the user 71 has likely determined that the current playlist order is not desirable. The system 31 may respond to such behavior by altering the filters dramatically in an attempt to change the composition of the playlist 91. In addition, a "play less by this artist" filter may be added for those media items in the playlist 91 passed over by the user 71. Conversely, a "play more by this artist" filter may be added for those media items specifically selected by the user 71.

In another example, a user 71 skips one or more media items during playback. In this example, a "play less of this song" filter may be added for each skipped media item. In addition, a "play less by this artist" filter may be added for all media items performed by the artist performing the skipped media item. Where two are more consecutive media items are skipped to play the next media item in the playlist 91, a "play more by this artist" filter may be added for the next media item in the playlist, because that media item was the destination of the user 71.

In still another example, a user 71 lowers the five-star rating of a media item but does not opt to skip the media item during playback. In this scenario, the system 31 may check to see if current selection filters favor this artist or media item. If the media item or artist is favored, the system may reduce the weighting of the filter proportionate to the decrease in rating.

In yet another example, a user 71 lowers the five-star rating of a media item and skips the media item. In this scenario, the system 31 may check to see if current selection filters favor this artist or media item. If the media item or artist is favored, the system may remove such filters altogether.

In still another example, a user 71 restarts play of the media item during playback. Where the user 71 restarts only a single media item, the system 31 does not react because the user was likely restarting the media item due to a listening interruption, rather than due to a listening related preference. But seeking to the start of two or more media items in one playback session may indicate a conscious effort by the user to hear desirable media items more often. Thus, once the user 71 restarts a second media item, the system 31 adds a "sounds that sound like" filter for each of the two media items restarted.

In another example, the user 71 may mute a playing media item. This may indicate to the system 31 that the user is a passive listener, rather than a more attentive or active listener. The system 31 may determine that such a passive listener is more open to suggestion of media items, such that the system may be more aggressive in adding new media items to the playlist 91.

Methods for Generating a Subgroup of Media Items

The present invention further comprises methods for generating a subgroup of one or more media items from a library of media items. The system comprises monitoring a user playback control action during a playback experience with the library. The method further comprises choosing a selecting filter based upon the monitored user playback control action and generating a subgroup of media items selected from the library of media items by applying the selecting filter to the library of media items.

The method may further comprise choosing an ordering filter based upon the monitored user playback control action and ordering the subgroup of media items by applying the chosen ordering filter to the subgroup of media items. The method may further comprise playing the subgroup of media items on a media player, wherein the generating and the ordering occur during the playing of the subgroup. Moreover, each of the choosing a selecting filter and the choosing an ordering filter may be based upon at least one of a past playback experience and a present playback experience. The choosing a selecting filter may comprise choosing two or more filters based upon two or more monitored user playback control actions. Each of the two or more filters may be based upon a corresponding user playback control action. In addition, the choosing an ordering filter may comprise choosing two or more filters based upon two or more monitored user playback control actions, each of the two or more filters based upon a corresponding user playback control action.

In another example, the choosing a selecting filter may comprise choosing two or more filters based upon two or more monitored user playback control actions, and the choosing an ordering filter may comprise choosing two or more filters based upon two or more monitored user playback control actions. The method may further comprise removing one or more of the two or more selecting filters based upon one or more other monitored user playback control actions and removing one or more of the two or more ordering filters based upon one or more other monitored user playback control actions. The choosing a selecting filter may further comprise choosing one filter based upon the combination of two or more monitored user playback control actions. Similarly, the choosing an ordering filter may further comprise choosing one filter based upon the combination of two or more monitored user playback control actions. The choosing a selecting filter based upon the monitored user playback control action may further comprise at least one of adding one or more filters, removing one or more filters, and modifying one or more filters. Moreover, the choosing an ordering filter based upon the monitored user playback control action may further comprises at least one of adding one or more filters, removing one or more filters, and modifying one or more filters.

General Purpose Computing Device

Figure 24:
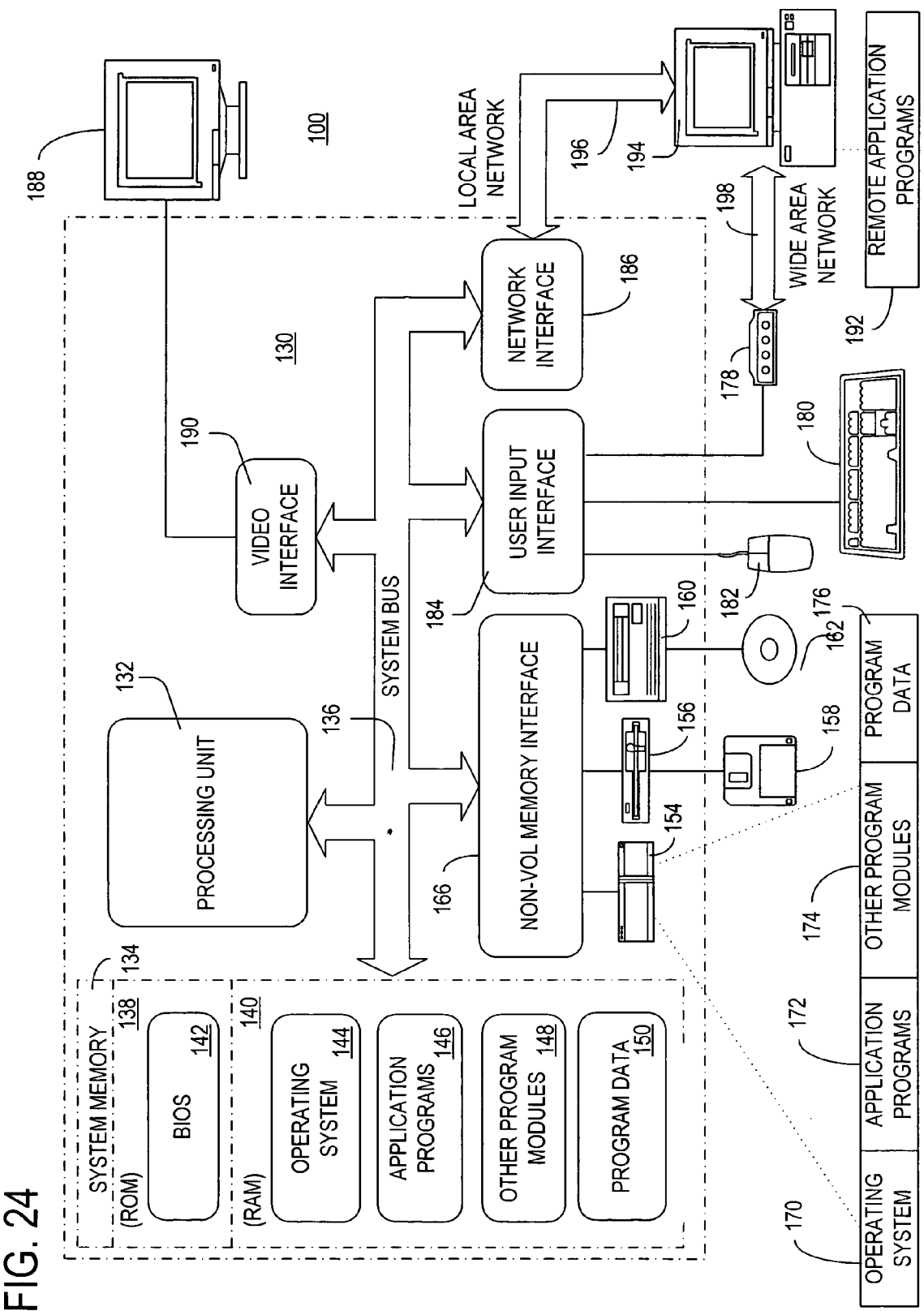
FIG. 24 is a block diagram illustrating one example of a suitable computing system environment in which the invention may be implemented.

FIG. 24 shows one example of a general purpose computing device in the form of a computer 130. In one embodiment of the invention, a computer such as the computer 130 is suitable for use in the other figures illustrated and described herein. In one example, the system 31 discussed above may be embodied by computer 130. Computer 130 additionally has one or more processors or processing units 132 and a system memory 134. In one example, the processor 41 discussed above may be embodied by processors or processing units 132, while the memory 61 discussed above may be embodied by system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 24 illustrates operating system 144, application programs 146, other program modules 148, and program data 150.

The computer 130 may also include other removable/non-removable, volatile/nonvolatile computer storage media. In one example, FIG. 24 illustrates a hard disk drive 154 that reads from or writes to non-removable, nonvolatile magnetic media. FIG. 24 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 24, provide storage of computer readable instructions, data structures, program modules and other data for the computer 130. In FIG. 24, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interface 55 discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 24 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 24 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a method such as described above for generating a subgroup of one or more media items from a library of media items. The computer 130

(or its components) monitors a user playback control action during a playback experience with the library. The computer 130 chooses a selecting filter based upon the monitored user playback control action. The computer 130 generates a subgroup of media items selected from the library of media items by applying the selecting filter to the library of media items.

In operation, the computer 130 also executes a method such as described above for ordering a subgroup of one or more media items from a library of media items. The computer 130 (or its components) monitors a user playback control action during a playback experience with the library. The computer 130 chooses an ordering filter based upon the monitored user playback control action. The computer 130 orders the subgroup of media items from the library of media items by applying the ordering filter to the subgroup of media items.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A system for generating a subgroup of one or more media items from a library of media items, said system comprising:
   a media player for playing media items in the library;
   a processor for monitoring direct and indirect user playback control actions not including a whitelist and not including a blacklist during a playback experience with the library, said playback experience comprising sequentially playing media items in a preexisting playlist of the library via the media player;
   a selecting filter adapted to generate a first subgroup of a plurality of media items from the library of media items, said processor choosing the selecting filter based upon the monitored user playback control action of the media item of the preexisting playlist being played by the media player and in response to receiving the user playback control action of the media item of the preexisting playlist being played by the media player, wherein the selecting filter generates the first subgroup of media items in response to the processor choosing the selecting filter, wherein the selecting filter is not based on a playback time of a media item, and wherein the selecting filter replaces the preexisting playlist during the playback experience by generating the first subgroup of media items and by substituting the generated first subgroup of media items for the preexisting playlist, the media player playing the plurality of media items of the first subgroup in sequence in place of the preexisting playlist, said substituting in response to and based on the monitored user control action;
   the selecting filter adapted to generate a second subgroup of a plurality of media items from the library of media items, said processor choosing the selecting filter based upon the monitored user playback control action of the media item of the first subgroup being played by the media player and in response to receiving the user playback control action of the media item of the first subgroup being played by the media player, wherein the selecting filter generates the second subgroup of media items in response to the processor choosing the selecting filter, wherein the selecting filter is not based on a playback time of a media item, and wherein the selecting filter replaces the first subgroup during the playback experience by generating the second subgroup of media items and by substituting the generated second subgroup of media items for the first subgroup, the media player playing the plurality of media items of the second subgroup in sequence in place of the first subgroup, said substituting in response to and based on the monitored user control action; and
   a user interface adapted for presenting the user with the subgroup of media items for playing on the media player and for receiving the user playback control action during the playback experience.

2. The system of claim 1 wherein said direct user control action consists of one of:
   pressing "PLAY" on a user interface without the media player running;
   pausing a playing media item;
   muting a playing media item;
   skipping to the next media item;
   seeking to the end of a media item;
   seeking to the beginning of a media item;
   skipping to a previous media item;
   stopping the media player while playing a media file;
   closing the media player;
   skipping two media items by the same artist;
   skipping three media items by the same artist;
   skipping a media item from a single album twice;
   skipping a media item from a single album three times;
   lowering the rating of a media item;
   raising the rating of a media item;
   lowering the rating of two media items from the same artist or album;
   raising the rating of two media items from the same artist or album;
   rating a previously unrated song; and said indirect user control action consisting of one of:
   minimizing the media player;
   maintaining the media player on top of a user interface;
   selecting to view media items now playing;
   browsing the library of media items;
   adding a media item to the playlist while another media item is playing;
   browsing media item merchants through the user interface while playing media items;
   changing a visualization associated with the media player;
   displaying a Metadata view for the currently playing media item;
   raising media player volume within five seconds of the beginning of a media item;
   lowering media player volume within five seconds of the beginning of a media item;
   playcount increments past top 10% of media items;
   playcount increments past top 25% of media items;
   playcount increments past top 50% of media items;
   adding a media item to the subgroup;

burning a media item to a redbook CD;
initiating user control actions at least N times in a time interval T;
creating a relatively small library with relatively many genres;
creating a relatively large library with relatively few genres;
creating a relatively large library with relatively many genres; and
initiating user actions at least X times in time S.

3. The system of claim 1 further comprising:
an ordering filter adapted to order said subgroup of media items, said processor choosing the ordering filter based upon the monitored user playback control action.

4. The system of claim 3 wherein said selection element consists of choosing one or more of the following filters:
album-based;
avoid speech/comedy;
bias by current date;
bias by day of week;
bias by favorite;
bias by household favorites;
bias by manual user avoidance;
bias by manual user selection;
bias by play popularity;
bias by time of day;
burning;
does not sound like;
exclude holiday music;
greatest hits mode—album;
greatest hits mode—artist;
library compendium CDs;
library samplers;
not recently played;
same energy;
same era;
same genre;
same mood;
skip 1 star rated;
skip parental rating;
skip sound-bytes;
songs not device-based;
sounds like;
user action bias filter; and
wherein said ordering filter consists of choosing one or more of the following filters:
artistic filter;
kid filter A;
kid filter B;
kid filter C;
kid filter D;
library preview;
balance artists;
bias by current time;
discography order;
don't follow with similar media item;
double-shots;
follow with similar;
follow with similar era;
followWithNextTrackOnAlbum;
not recently played;
not recently played artist;
old -vs- New;
pure shuffle;
random shuffle;
release year; and
tempo match.

5. The system of claim 3 wherein the playback experience monitored by the processor for user playback control action is at least one of a past playback experience and a present playback experience.

6. The system of claim 3 wherein said selecting filter comprises one or more filters, said ordering filter comprises one or more filters, and said processor adds, removes, or modifies at least one of said one or more selecting filters and said one or more ordering filters based upon the monitored user playback control action.

7. The system of claim 6 wherein said user interface is adapted for presenting the user with a selection element for providing feedback to the system regarding one or more of a media item, an artist, an album, and a genre, said processor adding, removing, or modifying at least one of said one or more selecting filters and said one or more ordering filters based upon the feedback provided by the user.

8. The system of claim 7 wherein said selection element is associated on the user interface with at least one of a currently playing media item, a media item scheduled to be played, and a media item included in the library but not included in the subgroup.

9. The system of claim 7 wherein said selection element consists of one or more of:
play this more;
play soundslike;
don't play right now;
never play this;
play more by this artist;
play next;
play this more; and
play this less.

10. The system of claim 3 wherein said user interface is further adapted for presenting the user with the subgroup of media items during said playing of the subgroup, and said processor is adapted for modifying the presented subgroup during said playing based upon the monitored user playback control action.

11. A method for ordering a subgroup of one or more media items from a library of media items, said method comprising:
monitoring a user playback control action not including a whitelist and not including a blacklist during a playback experience with the library, said monitoring including monitoring a direct user control action and monitoring an indirect user control action, wherein monitoring the user playback control action comprises receiving a first user playback control action via a user interface associated with the library during the playback experience, said playback experience comprising playing media items in a preexisting playlist of the library;
choosing a first ordering filter based upon the monitored first user playback control action and in response to receiving the first user playback control action, wherein the first ordering filter is not based on a playback time of a media item;
ordering the subgroup of media items from the library of media items by applying the first ordering filter to the subgroup of media items in response to choosing the first ordering filter;
replacing the playlist with the first ordered subgroup of media items during the playback experience, said replacing in response to and based on the monitored user control action;
receiving a second user playback control action via a user interface associated with the library during the playback experience;

choosing a second ordering filter based upon the monitored first user playback control action and in response to receiving the second user playback control action, wherein the second ordering filter is not based on a playback time of a media item;

ordering the subgroup of media items from the library of media items by applying the second ordering filter to the subgroup of media items in response to choosing the second ordering filter; and replacing the first ordered subgroup with the second ordered subgroup of media items during the playback experience, said replacing in response to and based on the monitored user control action.

12. The method of claim 11 further comprising:
choosing a selection filter based upon the monitored user playback control action; and
generating the subgroup of media items selected from the library of media items by applying the selecting filter to the library of media items.

13. The method of claim 12 further comprising presenting the user with the subgroup of media items during said playing of the subgroup and modifying the presented subgroup during said playing based upon the monitored user playback control action.

14. The method of claim 12 wherein said choosing consists of choosing one or more of the following filters:
album-based;
avoid speech/comedy;
bias by current date;
bias by day of week;
bias by favorite;
bias by household favorites;
bias by manual user avoidance;
bias by manual user selection;
bias by play popularity;
bias by time of day;
burning;
does not sound like;
exclude holiday music;
greatest hits mode—album;
greatest hits mode—artist;
library compendium CDs;
library samplers;
not recently played;
same energy;
same era;
same genre;
same mood;
skip 1 star rated;
skip parental rating;
skip sound-bytes;
songs not device-based;
sounds like;
user action bias filter; and
wherein said choosing an ordering filter consists of choosing one or more of the following filters:
artistic filter;
kid filter A;
kid filter B;
kid filter C;
kid filter D;
library preview;
balance artists;
bias by current time;
discography order;
don't follow with similar media item;
double-shots;
follow with similar;
follow with similar era;
followWithNextTrackOnAlbum;
not recently played;
not recently played artist;
old -vs- New;
pure shuffle;
random shuffle;
release year; and
tempo match.

15. The method of claim 11 wherein said direct user control action consists of one of:
pressing "PLAY" on a user interface without the media player running;
pausing a playing media item;
muting a playing media item;
skipping to the next media item;
seeking to the end of a media item;
seeking to the beginning of a media item;
skipping to a previous media item;
stopping the media player while playing a media file;
closing the media player;
skipping two media items by the same artist;
skipping three media items by the same artist;
skipping a media item from a single album twice;
skipping a media item from a single album three times;
lowering the rating of a media item;
raising the rating of a media item;
lowering the rating of two media items from the same artist or album;
raising the rating of two media items from the same artist or album;
rating a previously unrated song; and said indirect user control action consisting of one of:
minimizing the media player;
maintaining the media player on top of a user interface;
selecting to view media items now playing;
browsing the library of media items;
adding a media item to the playlist while another media item is playing;
browsing media item merchants through the user interface while playing media items;
changing a visualization associated with the media player;
displaying a Metadata view for the currently playing media item;
raising media player volume within five seconds of the beginning of a media item;
lowering media player volume within five seconds of the beginning of a media item;
playcount increments past top 10% of media items;
playcount increments past top 25% of media items;
playcount increments past top 50% of media items;
adding a media item to the subgroup;
burning a media item to a redbook CD;
initiating user control actions at least N times in a time interval T;
creating a relatively small library with relatively many genres;
creating a relatively large library with relatively few genres;
creating a relatively large library with relatively many genres; and
initiating user actions at least X times in time S.

* * * * *